US012362161B2

(12) United States Patent
Ryumin

(10) Patent No.: US 12,362,161 B2
(45) Date of Patent: Jul. 15, 2025

(54) CHARGE STATE DETERMINATION OF A SINGLE ION DETECTION EVENT

(71) Applicant: DH TECHNOLOGIES DEVELOPMENT PTE. LTD., Singapore (SG)

(72) Inventor: Pavel Ryumin, Concord (CA)

(73) Assignee: DH TECHNOLOGIES DEVELOPMENT PTE. LTD., Singapore (SG)

( * ) Notice: Subject to any disclaimer, the term of this patent is extended or adjusted under 35 U.S.C. 154(b) by 430 days.

(21) Appl. No.: 17/925,186

(22) PCT Filed: May 14, 2021

(86) PCT No.: PCT/IB2021/000330
§ 371 (c)(1),
(2) Date: Nov. 14, 2022

(87) PCT Pub. No.: WO2021/229301
PCT Pub. Date: Nov. 18, 2021

(65) Prior Publication Data

US 2023/0335384 A1 Oct. 19, 2023

Related U.S. Application Data

(60) Provisional application No. 63/024,897, filed on May 14, 2020.

(51) Int. Cl.
*H01J 49/02* (2006.01)

(52) U.S. Cl.
CPC .................................. *H01J 49/025* (2013.01)

(58) Field of Classification Search
USPC .................................................. 250/282, 281
See application file for complete search history.

(56) References Cited

U.S. PATENT DOCUMENTS

2004/0169137 A1* 9/2004 Westphall ............. H01J 49/027 250/281
2015/0069254 A1* 3/2015 Fernandez ............. H01J 49/16 250/389

(Continued)

FOREIGN PATENT DOCUMENTS

GB 2524357 9/2015
WO 2019/142068 7/2019

(Continued)

OTHER PUBLICATIONS

PCT International Preliminary Report on Patentability in Application PCT/IB2021/000330, mailed Nov. 24, 2022, 10 pages.

(Continued)

*Primary Examiner* — Kiet T Nguyen
(74) *Attorney, Agent, or Firm* — Potomac Law Group, PLLC

(57) ABSTRACT

Methods and systems for identifying or classifying charge states of detected ions. An example method for classifying a charge state of detected ions may include generating a pulse for each ion in a plurality of ions detected by a detector, wherein each pulse has a pulse characteristic; generating a pulse-characteristic distribution of the generated pulses; and based on the pulse-characteristic distribution, generating an identification of the charge state of one or more ions in the plurality of ions.

20 Claims, 23 Drawing Sheets

(56) References Cited

U.S. PATENT DOCUMENTS

| | | | |
|---|---|---|---|
| 2018/0005809 A1 | 1/2018 | Roukes | |
| 2018/0340827 A1 | 11/2018 | Yamada | |
| 2023/0282469 A1 | 9/2023 | Bloomfield | |
| 2023/0298876 A1 | 9/2023 | Bloomfield | |

FOREIGN PATENT DOCUMENTS

| | | |
|---|---|---|
| WO | 2019/197983 A1 | 10/2019 |
| WO | 2020/109091 | 6/2020 |
| WO | 2020/157720 A1 | 8/2020 |

OTHER PUBLICATIONS

Contino, Nathan C. et al., "Charge Detection Mass Spectometry with Resolved Charge States", Journal of the American Society for Mass Spectometry, vol. 24, No. 1, Nov. 30, 2012, pp. 101-108.

Kafader, Jared O. et al., "STORI Plots Enable Accurate Tracking of Individual Ion Signals", Journal of the American Society for Mass Spectometry, Elsevier Science, vol. 30, No. 11, Sep. 11, 2019, pp. 2200-2203.

Kafader, Jared O. et al., "Multiplexed Mass Spectometry of Individual Ions Improves Measurement of Proteoforms and Their Complexes", Nature Methods, Nature Pub. Group, NY, vol. 17, No. 4, Mar. 2, 2020, pp. 391-394.

PCT International Search Report and Written Opinion in Application PCT/IB2021/000330, mailed Oct. 6, 2021, 14 pages.

Hofstadler, Steven A. et al., "Selective Ion Filtering by Digital Thresholding: A Method to Unwind Complex ESI-Mass Spectra and Eliminate Signals from Low Molecular Weight Chemical Noise", Analytical Chemistry, vol. 78, No. 2, Jan. 1, 2006, pp. 372-378.

Kafader et al., "Measurement of Individual Ions Sharply Increases the Resolution of Orbitrap Mass Spectra of Proteins", Analytical Chemistry 2019, 91, 4, pp. 2776-2783.

Marty, Michael, et al., "Bayesian Deconvolution of Mass and Ion Mobility Spectra: From Binary Interactions to Polydisperse Ensembles", Anal. Chem. 2015, 87, 8, 4370-4376.

Pierson, Elizabeth et al., "Charge Detection Mass Spectomoetry for Single Ions with an Unceratinty in the Charge Measurement of 0.65 e", Journal of the American Society for Mass Spectometry, Elsevier Science, vol. 26, No. 7, Apr. 14, 2015, pp. 1213-1220.

Wehofsky, M. et al., "Automated deconvolution and deistoping of electrospray mass spectra", Journal of Mass Spectometry, vol. 37, Jan. 1, 2002, pp. 223-229.

Kolakowski, Beata et al., "Review of applications of high-field asymmetric waveform ion mobility spectrometry (FAIMS) and differential mobility spectrometry (DMS)", The Analyst, vol. 132, No. 9, Jun. 26, 2007, pp. 842-864.

* cited by examiner

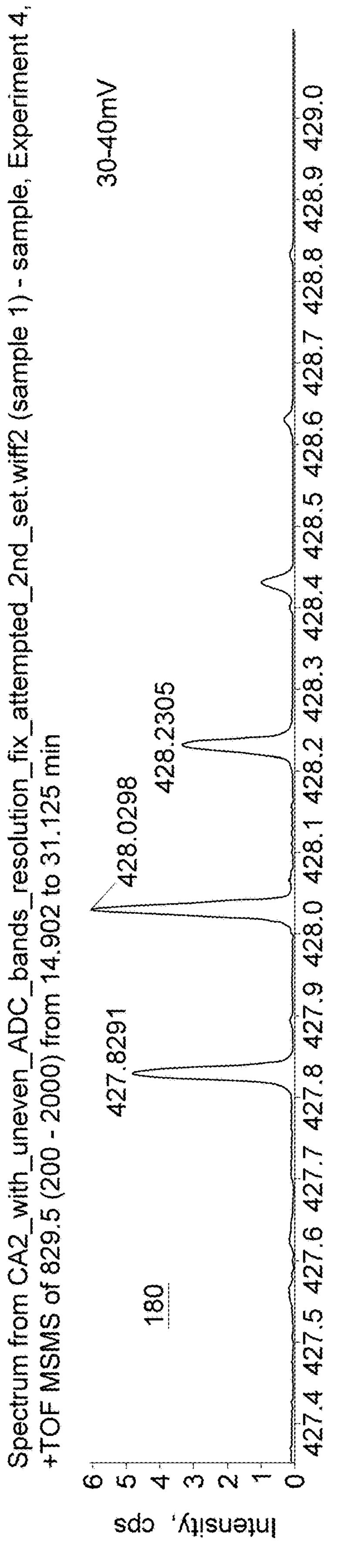
FIG. 1C (CONTINUATION)

320

3200

400

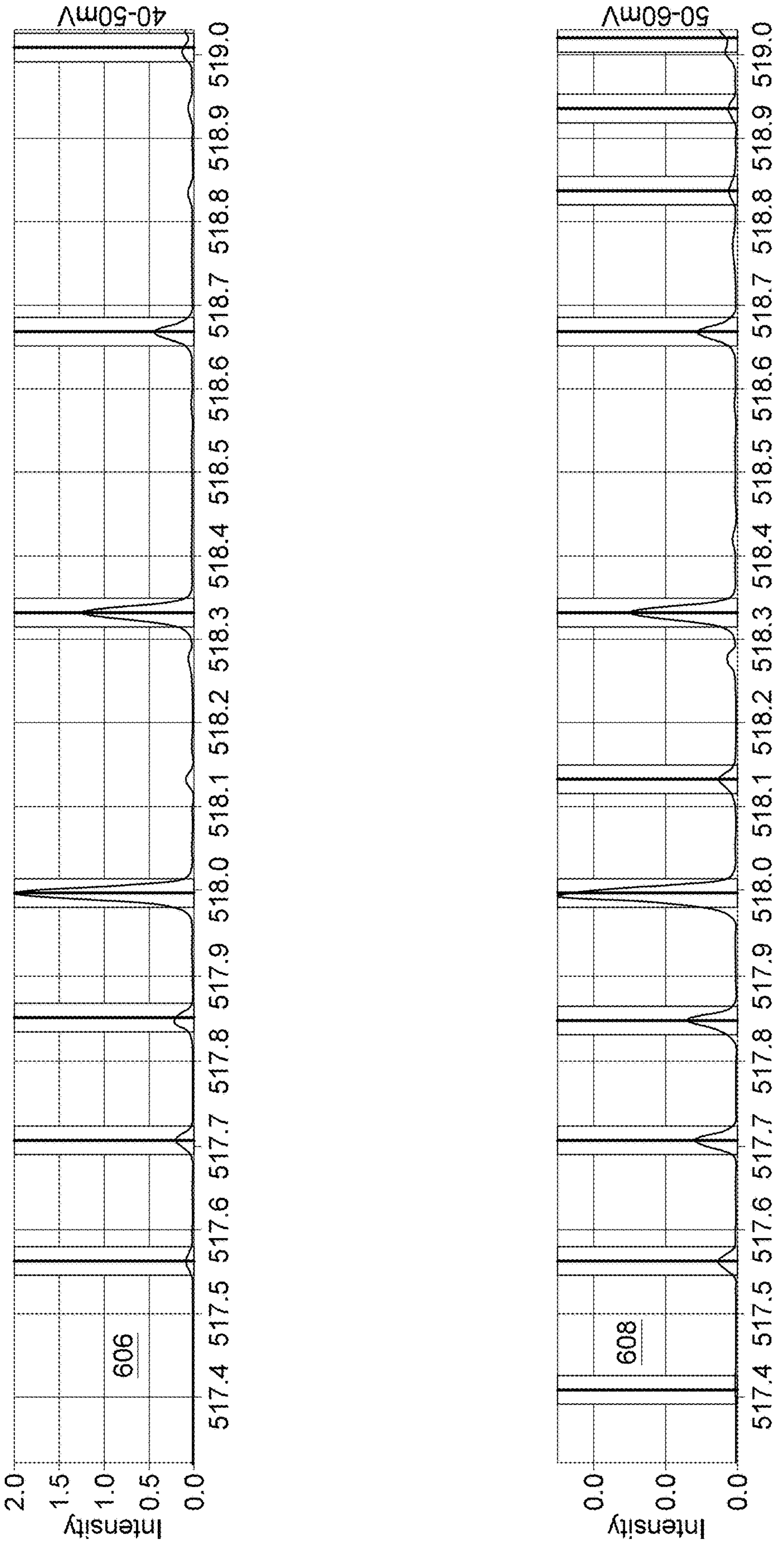
FIG. 6 (CONTINUATION)

800

| Mass/Charge | 517.566 | 517.708 | 517.851 | 518.003 | 518.137 | 518.337 | 518.673 |
|---|---|---|---|---|---|---|---|
| 517.566 | 0.00 | 0.07 | 0.06 | 0.31 | 0.02 | 0.34 | 0.35 |
| 517.708 | 0.07 | 0.00 | 0.01 | 0.35 | 0.05 | 0.38 | 0.40 |
| 517.851 | 0.06 | 0.01 | 0.00 | 0.34 | 0.04 | 0.37 | 0.39 |
| 518.003 | 0.31 | 0.35 | 0.34 | 0.00 | 0.32 | 0.04 | 0.06 |
| 518.137 | 0.02 | 0.05 | 0.04 | 0.32 | 0.00 | 0.35 | 0.36 |
| 518.337 | 0.34 | 0.38 | 0.37 | 0.04 | 0.35 | 0.00 | 0.03 |
| 518.673 | 0.35 | 0.40 | 0.39 | 0.06 | 0.36 | 0.03 | 0.00 |

FIG. 8

First feature

| | Mass/Charge | Distance | Charge |
|---|---|---|---|
| 0 | 517.566 | 0.142 | 7.04 |
| 1 | 517.708 | 0.142 | 7.04 |
| 2 | 517.851 | 0.143 | 6.99 |
| 3 | 518.137 | 0.286 | 3.50 |

Consensus
Charge state: 7

Second feature

| | Mass/Charge | Distance | Charge |
|---|---|---|---|
| 0 | 518.003 | 0.334 | 2.99 |
| 1 | 518.337 | 0.334 | 2.99 |
| 2 | 518.673 | 0.336 | 2.98 |

Consensus
Charge state: 3

FIG. 9

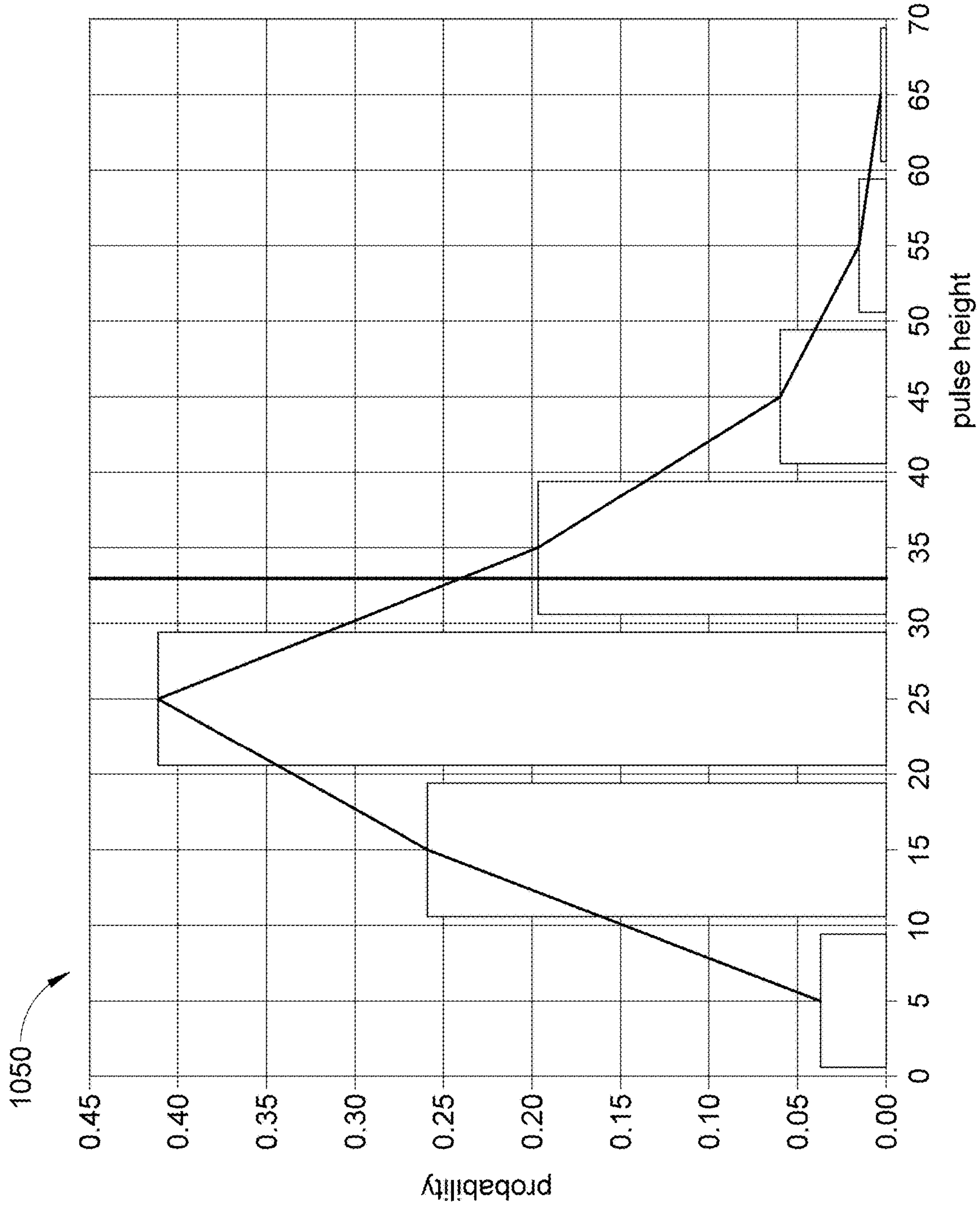
FIG. 10 (CONTINUATION)

CHARGE STATE DETERMINATION OF A SINGLE ION DETECTION EVENT

CROSS-REFERENCE TO RELATED CASES

This application is a National Stage Application of PCT International Patent Application No. PCT/IB2021/000330, filed May 14, 2021, which claims the benefit of priority to U.S. Patent Application Ser. No. 63/024,987, filed May 14, 2020, the contents of which are incorporated herein by reference in their entireties. To the extent appropriate, a claim of priority is made to each of the above disclosed applications.

BACKGROUND

As a general overview, mass spectrometry (MS) is an analytical technique for the detection and quantitation of chemical compounds based on the analysis of mass-to-charge (m/z) values of ions formed from those compounds. MS involves ionization of one or more compounds of interest from a sample, producing precursor ions, and mass analysis of the precursor ions. Tandem mass spectrometry or mass spectrometry/mass spectrometry (MS/MS) involves ionization of one or more compounds of interest from a sample, selection of one or more precursor ions of the one or more compounds, fragmentation of the one or more precursor ions into product ions, and mass analysis of the product ions.

Both MS and MS/MS can provide qualitative and quantitative information. The measured precursor or product ion spectrum can be used to identify a molecule of interest. The intensities of precursor ions and product ions can also be used to quantitate the amount of the compound present in a sample.

Mass spectrometry techniques often generate mass spectrum data utilizing a mass-to-charge ratio (m/z) for detected ions. Knowledge of the actual charge or mass of the detected ions, however, is often not directly measurable. As a result, some overlap of detected ions may occur in certain scenarios. For example, a singularly charged ion with a mass may appear in the mass spectrum as having the same mass-to-charge ratio as a doubly charged ion with double the mass. This issue may generally be referred to as a peak overlapping problem.

In top-down mass spectrometry (MS) protein analysis, for example, overlapping of mass or mass-to-charge (m/z) peaks in a mass spectrum is a significant problem. In this type of analysis, a very wide range of different fragment or product ions are produced, including product ions that have lengths of 1-200 amino acids and have 1-50 different charge states. The product ion peaks are heavily overlapped with each other in a single spectrum. In addition, the overlap can be so extensive that even mass spectrometers with the highest mass resolution (Fourier transform ion cyclotron resonance (FT-ICR) or orbitrap) cannot deconvolve such overlapped peaks. As a result, large product ions are often lost in top-down protein analysis, limiting the sequence coverage of large proteins. International Publication WO2020/157720, published on Aug. 6, 2020, and International Publication WO2019/197983, published on Oct. 17, 2019, both provide additional discussion of a top-down MS protein analysis and associated challenges.

SUMMARY

In an aspect, the technology relates to a method for classifying a charge state of detected ions, the method comprising: generating a pulse for each ion in a plurality of ions detected by a detector, wherein each pulse has a pulse characteristic; generating a pulse-characteristic distribution of the generated pulses; and based on the pulse-characteristic distribution, generating an identification of the charge state of one or more ions in the plurality of ions.

In an example, the pulse-characteristic distribution is a plot of probability versus pulse characteristic. In another example, the pulse characteristic is at least one of a pulse height, a pulse width, or a pulse area. In a further example, the pulse characteristic is pulse height, and the pulse height is a maximum voltage of the pulse. In yet another example, the detector is an electron multiplier detector and the detector is configured to detect predominantly single ion events. In still another example, generating an identification of the charge state comprises comparing the pulse-characteristic distribution with a reference pulse-characteristic distribution. In still yet another example, the ions detected by the detector are generated from ionization of a sample, and the reference pulse-characteristic distribution is identified based on known characteristics of the sample.

In another example, the generated identification comprises a probability of the charge state. In a further example, the method further includes based on the identification of the charge state, generating a deconvolved mass spectrum for the detected ions, wherein one axis of the mass spectrum is mass rather than mass per charge (m/z). In still another example, the plurality of ions are grouped using m/z domain into different groups, and the identification of charge state based on the pulse-characteristic distribution is performed for each group. In yet another example, the grouping step comprises generating mass spectrums based on the plurality of detected ions; identifying a first peak in the mass spectrum, wherein the first peak has a mass per charge (m/z) value; and grouping ions within a mass per charge (m/z) range, based on the m/z value of the first peak. In still yet another example, the grouping step comprises selecting a first subset of the plurality of ions into a first intensity band and selecting a second subset of the plurality of ions into a second intensity band; generating a first mass spectrum for the first intensity band; generating a second mass spectrum for the second intensity band; identifying a first peak in at least one of the mass spectra, wherein the first peak has a mass per charge (m/z) value; and grouping ions within a mass per charge (m/z) range, based on the m/z value of the first peak.

In another example, the method further includes generating a second pulse-characteristic distribution for the ions within the m/z range, and generating the identification includes: determining that ions forming the first pulse-characteristic distribution have a first charge state; and determining that ions forming the second pulse-characteristic distribution have a second charge state. In a further example, the method further includes based on the identification of the charge state, determining one or more isotopes corresponding to the one or more ions forming the first peak. In yet another example, generating an identification of the charge state comprises comparing the first pulse-characteristic distribution with a reference pulse-characteristic distribution. In still another example, the ions detected by the detector are generated from ionization of a sample, and the reference pulse-characteristic distribution is identified based on known characteristics of the sample. In still yet another example, the generated identification comprises a probability of the charge state. In another example, the method is performed as part of a top-down protein analysis.

In another example, the method further includes identifying a second peak; based on at least the first peak and the second peak, determining a consensus m/z distance; identifying that the first peak and the second peak form a feature; and wherein generating the identification of the charge state is based on the consensus distance. In a further example, the step of identifying that the peaks form the feature comprises comparing pulse-characteristic distributions of said peaks and selecting peaks with substantially the same pulse-characteristic distributions. In still another example, the comparison of pulse-characteristic distribution is performed by calculating Euclidean distance between said pulse-characteristic distributions and comparing it with a predetermined threshold. In yet another example, the method further includes, based on the consensus distance, identifying a missing peak corresponding to the feature. In still yet another example, the method further comprises, based on the identification of the charge state of the ions, generating a deconvolved mass spectrum for the detected ions, wherein one axis of the mass spectrum is mass rather than m/z. In another example, the pulse characteristic is a maximum voltage of the pulse.

In another aspect, the technology relates to a mass analysis system. The mass analysis system includes a detector to configured to generate a pulse for each ion detected by the detector; a processor; and a memory storing instructions that are configured to, when executed by the processor, cause the system to perform a set of operations. The operations include generating a pulse for each ion in a plurality of ions impacting an electron multiplier detector, wherein each pulse has a pulse characteristic; generating a pulse-characteristic distribution of the generated pulses; and based on the pulse-characteristic distribution, generating an identification of a charge state of one or more ions in the plurality of ions. In an example, the detector is an electron multiplier detector. In another example, the mass analysis system further includes an ion source device, a dissociation device, and a mass analyzer.

In another aspect, the technology relates to a method for classifying a charge state of detected ions, the method includes detecting a transient time-domain signal induced on an image-charge detector of the mass analyzer by oscillations of a plurality ions in the mass analyzer using a processor; converting the transient time-domain signal to a plurality of frequency-domain (FD) peaks corresponding to ions in the plurality of ions; generating an FD-peak-characteristic distribution of the generated pulses; and based on the FD-peak-characteristic distribution, generating an identification of the charge state of one or more ions in the plurality of ions.

In an example, the FD-peak-characteristic distribution is a plot of probability versus FD-peak characteristic. In another example, the FD-peak characteristic is a peak intensity. In still another example, generating an identification of the charge state includes comparing the FD-peak-characteristic distribution with a reference FD-peak-characteristic distribution. In a further example, the ions detected by the detector are generated from ionization of a sample, and the reference FD-peak-characteristic distribution is identified based on known characteristics of the sample. In still another example, the generated identification comprises a probability of the charge state. In yet another example, the method further includes, based on the identification of the charge state, generating a deconvolved mass spectrum for the detected ions, wherein one axis of the mass spectrum is mass rather than mass per charge (m/z).

In another aspect, the technology relates to a method for classifying a charge state of detected ions. The method includes generating a pulse for each ion in a plurality of ions detected by a detector, wherein each pulse has a pulse characteristic; generating pulse-characteristic distributions of the generated pulses; and based on the pulse-characteristic distributions, identifying a coarse charge state; identifying a peak pair of a first ion peak and a second ion peak, such that said peaks have adjacent charge states; and based on an m/z value for the first ion peak, an m/z value for the second ion peak, and a mass of a charge carrier, determining a refined charge state of the second ion peak.

In an example, the coarse charge state identification is accurate to a range of possible charge states for at least one peak forming a pair and at least one charge state from the range is adjacent to the charge state identified for the second peak. In another example, the method further includes accepting the refined charge state identification if the refined identified charge state is an integer within a certain threshold. In still another example, a third peak with an adjacent charge state is identified and the third peak forms a pair with at least one of the peaks and charge state identifications for said common peak are matching in both pairs. In yet another example, the method further includes, based on the determined charge state of the second ion peak, determining the charge state of the first ion peak. In still yet another example, the method further includes obtaining the mass of the charge carrier based on known characteristics of a sample ionized to generate the plurality of ions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 8 depicts an example pairwise similarity matrix.

FIG. 9 depicts example calculations for most plausible charge states.

DETAILED DESCRIPTION

Figure 1A:
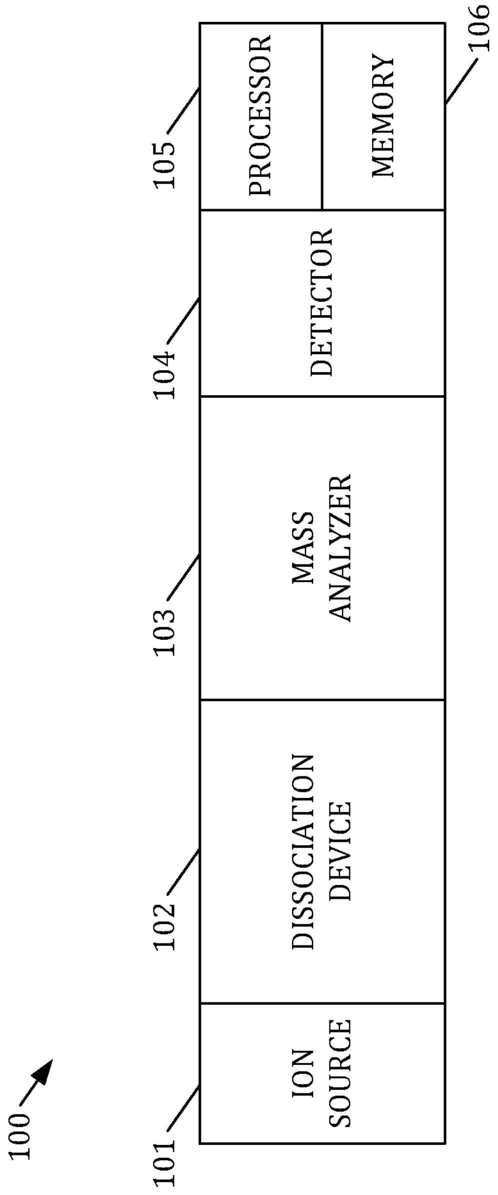
FIG. 1A depicts an example system for performing mass spectroscopy.

As briefly discussed above, peak overlapping of detected ions is problematic for analysis of MS results. To resolve this peak overlapping problem, one solution is to determine or infer the charge state of the ions forming the peak. By determining the charge state, the mass of the ion may then be resolved and ions from different species can be distinguished from one other. In addition, multiple peaks in a mass spectrum may be represent an isotopic cluster or feature. In some cases, it may be unclear however which peaks belong to which cluster. Charge state identification techniques can further resolve the identification of the proper peaks for such clusters.

Analog to Digital Conversion (ADC) banding methods have previously been proposed for separating ions based on their intensity. One such example of a banding method is disclosed in International Publication WO2020/157720 (the '720 Publication), published on Aug. 6, 2020, which is incorporated by reference herein in its entirety. Such separation based on ion intensity facilitates charge state separation, thus improving peak capacity. However, the described methods do not teach how to separate ions based on their charge states. This leads to two problems: first, the signal originating from the same specie is diluted between multiple data channels, second, there is no proposed way to construct deconvolved mass spectrum convenient for subsequent data interpretation. It is therefore desired to have an improved method, which can assign charge states to individual ion detection events.

One of such methods has been recently published in the following paper: Kafader et al., Multiplexed mass spectrometry of individual ions improves measurement of proteoforms and their complexes, Nature Methods, Nature Methods volume 17, pages 391-394(2020). However, the described method in that paper is limited to mass spectrometers with detection systems where the detected signal has a deterministic relationship with respect to measured charge (e.g. image-charge induced detectors). Accordingly, among other things, the described method in that paper does not teach how to setup charge assignment for each individual ion measurement event for a mass spectrometer based on detection system where the measured signal has probabilistic relationship with respect to measured charge (e.g., electron-multiplier based detection systems).

In some of such new class of acquisition strategies, direct identification of charge state is attempted prior to co-adding corresponding signal to a mass spectrum (see Kafader et. al.). However, such strategies are not applicable for charge state assignment in electron-multiplier detection systems. In many cases for systems based on electron-multiplier detection systems, each charge state does not have a distinct detector response, but instead has a distinct pulse height distribution (more generically intensity distribution) specific to each charge state and m/z values.

The present technology allows for a determination or inference of a charge state of an ion according to characteristics of a pulse generated by the detector upon detecting the ion. To do so, the present technology generates a distribution of a pulse characteristic for multiple detected ions. The pulse characteristic may include a pulse height, a pulse width, or a pulse area, among other possible characteristics. The distribution of the pulse characteristics form distinct profiles depending on the charge state of the detected ions. Thus, charge state may be determined the pulse-characteristic distributions. Once the charge state of the ion is determined, the mass of the ion may be determined based on m/z of the ion, and the ion may be distinguished from other ions. Ultimately, the compound that is being analyzed by the MS technique may be identified based on the determined charge states of the detected ions. Thus, by identifying and/or assigning the charge state of an ion, the measurement capabilities of a mass analysis instrument are improved. The accuracy of the mass analysis instrument may also similarly be improved.

FIG. 1A depicts an example mass analysis system 100 for performing mass spectrometry techniques. In some examples, the system 100 may be a mass spectrometer. The example system 100 includes an ion source device 101, a dissociation device 102, a mass analyzer 103, a detector 104, and computing elements, such as a processor 105 and a memory 106. The ion source device 101 may be an electrospray ion source (ESI) device, for example. The ion source device 101 is shown as part of a mass spectrometer or may be a separate device. The dissociation device 102 may be an Electron-based dissociation (ExD) device or collision-induced dissociation (CID) device, for example. Electron-based dissociation (ExD), ultraviolet photodissociation (UVPD), infrared photodissociation (IRMPD) and collision-induced dissociation (CID) are often used as fragmentation techniques for tandem mass spectrometry (MS/MS). ExD can include, but is not limited to, electron capture dissociation (ECD) or electron transfer dissociation (ETD). CID is the most conventional technique for dissociation in tandem mass spectrometers. As described above, in top-down and middle-down proteomics, an intact or digested protein is ionized and subjected to tandem mass spectrometry. ECD, for example, is a dissociation technique that dissociates peptide and protein backbones preferentially. As a result, this technique is an ideal tool to analyze peptide or protein sequences using a top-down and middle-down proteomics approach.

The mass analyzer 103 can be any type of mass analyzer used for a desired technique, such as a time-of-flight (TOF), an ion trap, or a quadrupole mass analyzer. The detector 104 may be an appropriate detector for detection ions and generating the signals discussed herein. For example, the detector 104 may include an electron multiplier detector that may include analog-to-digital conversion (ADC) circuitry. The detector 104 may also be an image charge induced detector. The detector 104 produces detection pulses for detected ions.

The computing elements of the system 100, such as the processor 105 and memory 106, may be included in the mass spectrometer itself, located adjacent to the mass spectrometer, or be located remotely from the mass spectrometer. In general, the computing elements of the system may be in electronic communication with the detector 104 such that the computing elements are able to receive the signals generated from the detector 104. The processor 105 may include multiple processors and may include any type of suitable processing components for processing the signals and generating the results discussed herein. Depending on the exact configuration, memory 106 (storing, among other things, mass analysis programs and instructions to perform the operations disclosed herein) can be volatile (such as RAM), non-volatile (such as ROM, flash memory, etc.), or some combination of the two. Other computing elements may also be included in the system 100. For instance, the system 100 may include storage devices (removable and/or non-removable) including, but not limited to, solid-state devices, magnetic or optical disks, or tape. The system 100 may also have input device(s) such as touch screens, keyboard, mouse, pen, voice input, etc., and/or output device(s) such as a display, speakers, printer, etc. One or more communication connections, such as local-area network (LAN), wide-area network (WAN), point-to-point, Bluetooth, RF, etc., may also be incorporated into the system 100.

Figure 1B:
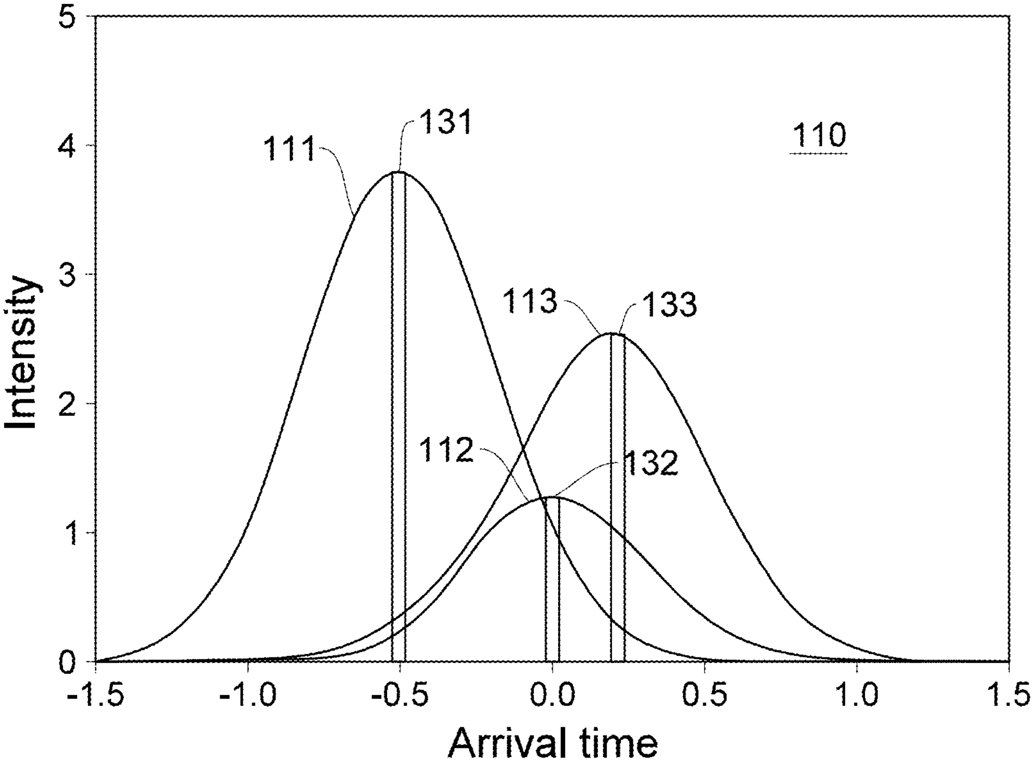
FIG. 1B depicts an example plot of ion pulses.

FIG. 1B depicts an example plot 110 of ion pulses generated from a detector, such as an electron-multiplier detector. The y-axis represents an intensity, and the x-axis represents time. The intensity may be in units of voltage. For instance, for an electron multiplier detector, the output of the detector may be a voltage (often represented in millivolts (mV)) based on the detected electrons.

In FIG. 1B, three pulses are depicted—a first pulse 111, a second pulse 112, and a third pulse 113. Each of the pulses 111-113 represent different single ion arrivals at the detector. The pulses 111-113 may be digitized, and a peak may be found from each digitized pulse. An intensity (or peak height) and arrival time pair may be calculated and stored for each of the pulses. Rectangles 131, 132, and 133 represent the intensity, or pulse height, of the respective pulse.

Each of the pulses may be characterized by pulse characteristics. The pulse characteristics may include characteristics such as pulse height, pulse width, and/or area under the curve of the pulse. The pulse height of each pulse is indicated by the rectangles 131, 132, and 132. The pulse height may be the maximum pulse height for the respective pulse, and the pulse height may have units of voltage. The pulse width may be at any point of the pulse, but one measure of pulse width may be the full width at half maximum (FWHM). The pulse width may have units of time. The area under the pulse curve may be generated by integrating the area under the respective pulse signal for each pulse.

Figure 1C:
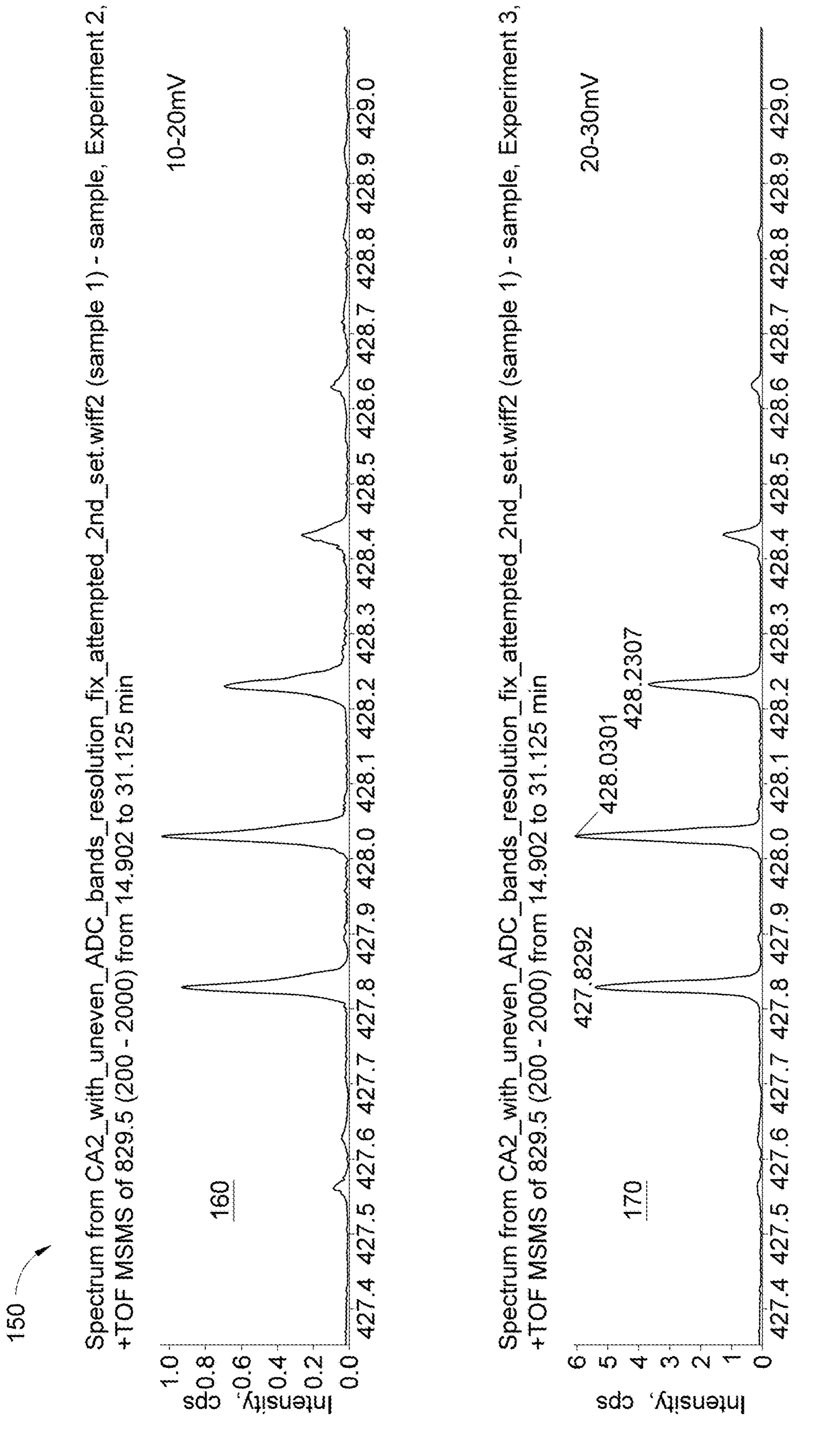
FIG. 1C depicts example mass spectra separated into different bands or channels based on ion pulse intensities.

The pulse characteristics may be used to separate the detected ions into different bands. FIG. 1C depicts example mass spectra 150 separated into different bands or channels based on ion pulse characteristics—specifically maximum pulse height. A first mass spectrum 160 is generated for detected ions having a maximum pulse height between 10-20 mV. A second mass spectrum 170 is generated for detected ions having a maximum pulse height between 20-30 mV. A third mass spectrum 180 is generated for detected ions having a maximum pulse height between 20-30 mV. Additional details regarding such separation and banding is discussed further in the '720 Publication. As discussed above, while separating ions into different bands has benefits, the separation does not allow for the identification of a charge state of a particular ion. As discussed further herein, the pulse characteristics may be utilized to generate distribution profiles that allow for charge state classifications of the ions.

Figure 2:
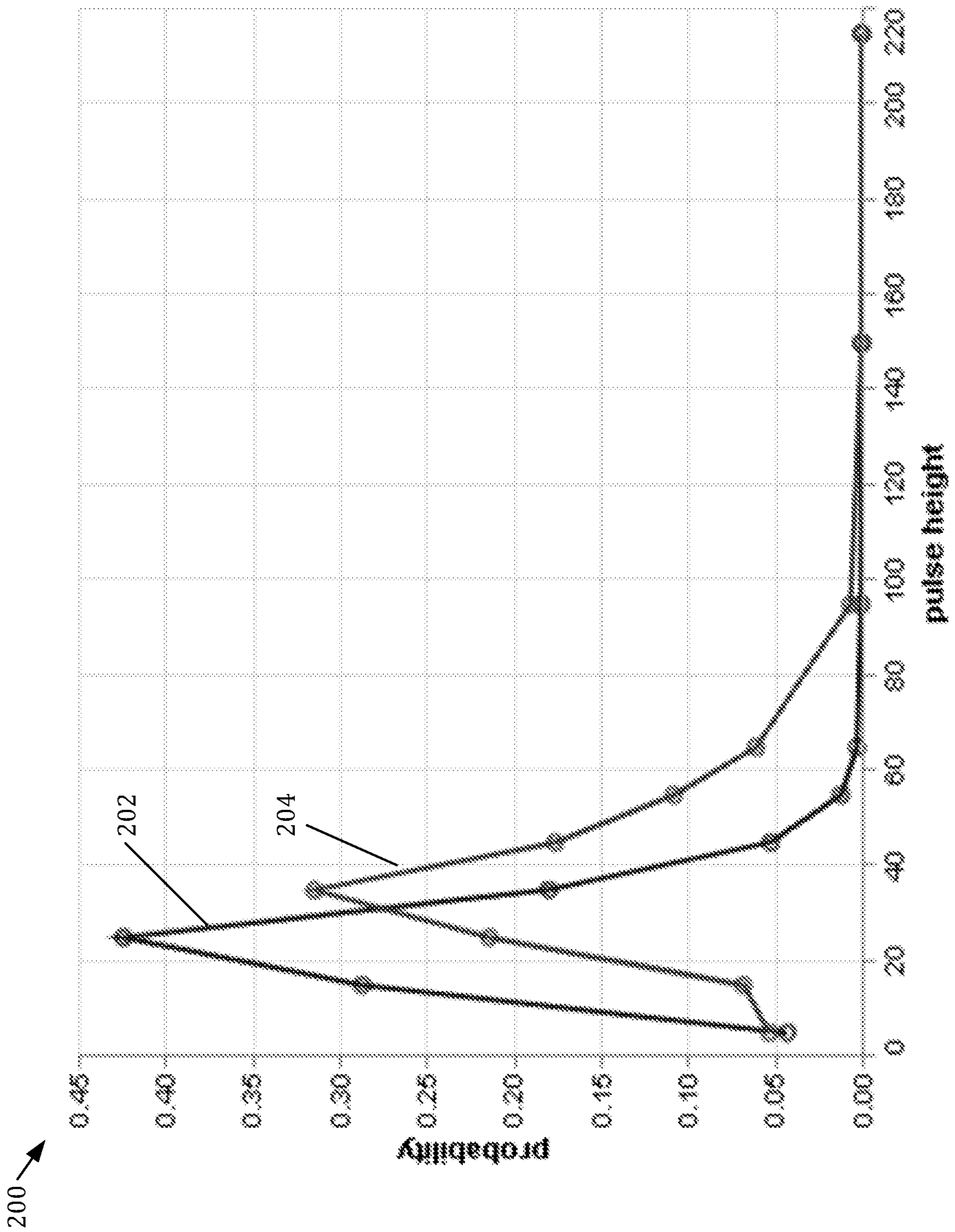
FIG. 2 depicts a plot of example pulse-height distributions.

FIG. 2 depicts a plot 200 of example pulse-characteristic distributions. The pulse characteristic distributions in the plot 200 are based on the characteristic of pulse height. Accordingly, the pulse-characteristic distributions may be referred to as pulse-height distributions or intensity distributions. In the plot, the x-axis represents the pulse height, and the y-axis indicates a probability or frequency of detection. For example, a higher probability value indicates that ions having the corresponding pulse height were detected more frequently.

A first pulse-height distribution 202 and a second pulse-height distribution 204 are depicted in the plot 200. As can be seen from the plot 200, the pulse-height distributions overlap, but the first pulse-height distribution 202 has a profile that is distinct from the profile of the second pulse-height distribution 204. The difference in profile shape is predominately due to a different in charge state of the detected ions forming the respective pulse-height distributions. For instance, the detected ions forming the first pulse-height distribution 202 correspond to a 3+ charge ion, and the detected ions forming the second pulse-height distribution 204 correspond to a 7+ charged ion. Accordingly, once various pulse-height distributions have been established or generated, it may be possible to determine a charge state of any single detected ion by determining on which pulse-height distribution profile the corresponding ion pulse fits.

As some additional detail, the pulse-height distributions 202, 204 were generated for product ions having very similar m/z values at approximately 517. The product ions were generated from a top-down ECD analysis of carbonic anhydrase 2 (CA2). As discussed above, as can be seen in plot 200, the pulse-height distributions originating from different charge states can significantly overlap. In case of such overlap, a single intensity data point is insufficient, and any charge state determination based on a single intensity data point will have a significant chance being incorrect.

However, for ensembles of single ion detection events originating from the same sample, it is sometimes possible to infer charge state. This can be achieved either by comparing the pulse-height distribution of such ensemble to a set of pulse-height distributions of known compounds with similar m/z and charge states or using extra information usually available based on the nature of the analyzed sample. An example of such extra information can be a distinct isotope pattern, which if resolved by mass spectrometer encode charge state information in their relative positions in m/z space. Alternatively, a charge state distribution can be used for this purpose, which also encode charge state information in their relative positions in m/z space. In this disclosure, a class of methods for charge state identification of single detection events based on grouping of similar detection events in ensembles, assignment of charge state to the ensembles, and subsequent assignment of charge state information for individual events is described.

In an example, a data set containing pulse-height distributions for different charge states and m/z is collected. The pulse-height distributions for the group of ions may be used to assign a charge state for individual detection events. For a detection event corresponding to unknown specie, an ensemble of detection events may be selected based on their relative proximity in m/z space. A pulse-height distribution may be calculated for such ensemble. This pulse-height distribution may then be matched to the known pulse-height distributions from a similar m/z and a "best" match is selected. As will be appreciated, the term "best" may be used to identify a relatively determined optimum state given the data acquired and the determination effort applied. A charge state of best match is then inferred for each detection event and/or corresponding ion from the ensemble. Alternatively or additionally, a model may be constructed based on well characterized data of intensity distributions for different m/z and charge state can be predicted based on this model. This can be achieved for example using machine learning techniques, where training data set may contain annotated data collected a priori.

In another example, in the first step, collected data of individual detection events may be summed to form a conventional mass spectrum or alternatively multiple mass spectra based on its intensity. In the second step, algorithms are employed to do feature extraction and feature charge state assignment, where the feature is an isotope cluster or charge state cluster corresponding to the same molecule. In the third step, the determination of ensembles of ion detection events corresponding to those features and subsequent inference of the charge state is performed.

In another example, a data acquisition and processing strategy is presented, which combines both the information on pulse-height distributions of individual groups of ions and extra information known about the nature of the sample, e.g., isotope pattern or charge state distributions, to identify ensembles of detection events originating from similar ions and subsequently assign charge states to the individual ions.

Figure 3A:
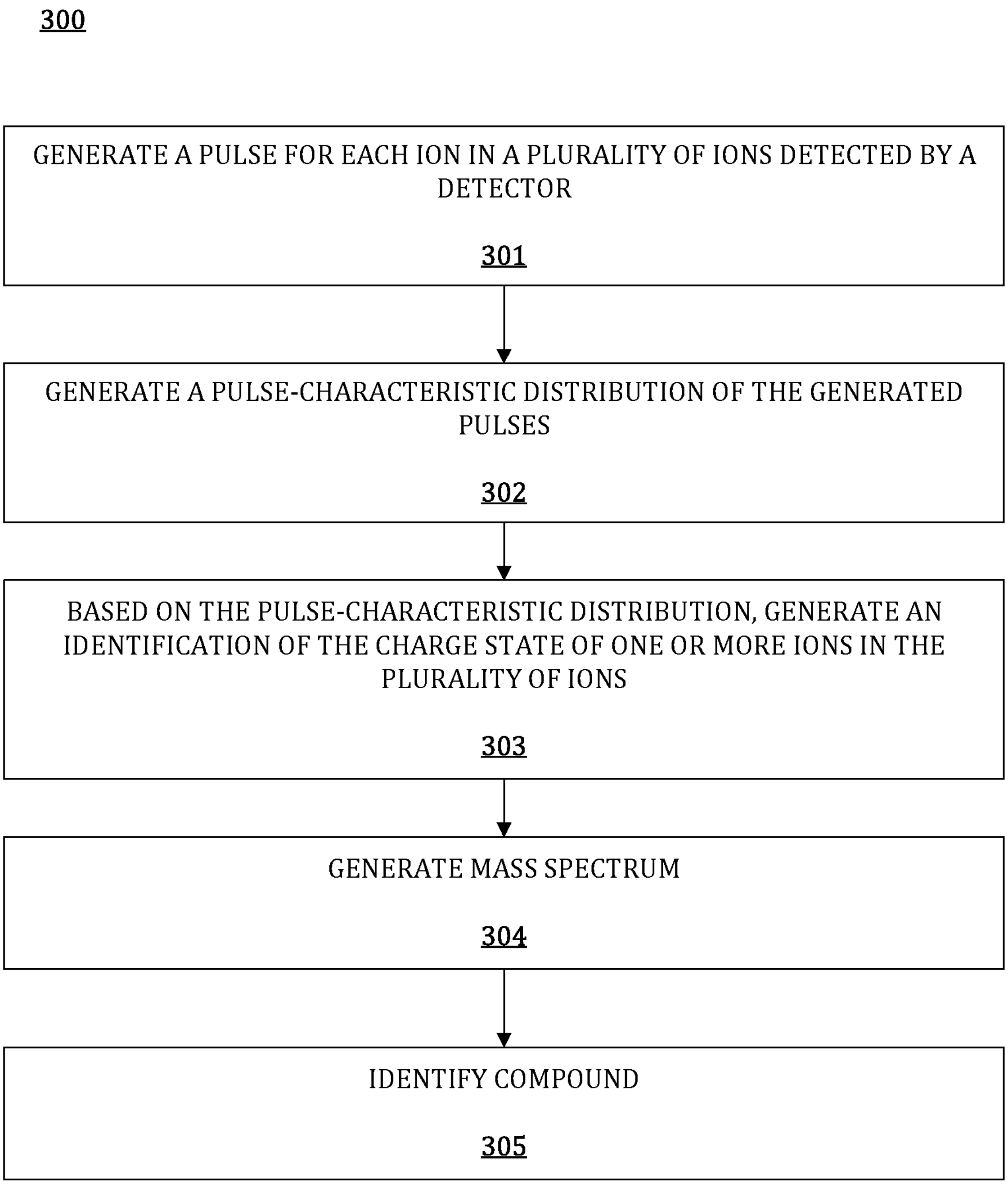
FIG. 3A depicts an example method for charge state assignment.

FIG. 3A depicts an example method 300 for charge state assignment. At operation 301, a pulse is generated for each ion in a plurality of ions detected by a detector. For example, when an ion impacts an electron multiplier detector, a pulse is generated. The generated pulses may be similar to the pulses depicted in FIG. 1B and discussed above. Each of the pulses may have, or be described, by their respective pulse characteristics. The detected ions maybe ions ionized from a sample being investigated or analyzed by a mass analysis technique. At operation 302, one or more pulse-characteristic distributions are generated based on characteristics of the pulses. For example, the generated pulse-characteristic distributions may be generated for a particular pulse characteristic, such as pulse height. Accordingly, the pulse-characteristic distribution(s) generated in operation 302 may be pulse-height distributions similar to the pulse-height distributions depicted in FIG. 2 and discussed above.

Based on the pulse-characteristic distribution(s) generated in operation 302, an identification of the charge state of one or more ions in the plurality of ions may be generated at operation 303. For example, generated pulse-characteristic distribution may be compared to a set of reference pulse-characteristic distributions with known charge states to determine the closest match to the generated pulse-characteristic distribution. The charge state of the ions forming the generated pulse-characteristic distribution may then be assigned the charge state associated with the reference pulse-characteristic distribution. The number of reference pulse-characteristic distributions for which the generated pulse-characteristic distribution is compared may be limited or reduced based on external information or known characteristics about the sample being analyzed and/or the m/z values of the ions forming the generated pulse-characteristic distribution. For instance, a subset of reference pulse-characteristic distributions may exist for a particular m/z value or range, and/or a subset of reference pulse-characteristic distributions may correspond to particular isotopes, compounds, and/or samples.

In other examples, a machine learning model (e.g., neural network) may be trained based on a set of reference pulse-characteristic distributions with known charge states. The generated pulse-characteristic distribution may be provided as an input into the trained machine learning model. The trained machine learning model processes the input generated pulse-characteristic distribution, and the output of the trained machine learning model is indicative of the charge state or a likely charge state that corresponds to the generated pulse-characteristic distribution. For instance, the output of the machine learning model may be a charge state indication and/or an indication of the reference pulse-characteristic distribution that most closely matches the generated pulse-characteristic distribution. In some examples, the input to the trained machine learning model may also include an m/z value or an m/z range for the ions forming the generated pulse-characteristic distribution. Additionally or alternatively, the input may also include external data regarding the sample, such as an expected compound or isotope type. In other examples, different machine learning models may be trained for different types of samples, and the machine learning model for the sample being analyzed may be selected for use in analyzing the generated pulse-characteristic distribution.

The identification or assignment of charge state may also, or alternatively, be based on grouping peaks together as features and then analyzing the relative distance between grouped peaks. Additional detail regarding such a charge assignment process is discussed in further detail below with respect to method 3000 in FIG. 3D.

Returning to method 300 in FIG. 3A, at operation 304, a mass spectrum is generated for the detected ions. The mass spectrum may be generated based on the identified charge state(s) in operation 303. For example, with the known charge state, overlapping peaks may be resolved or otherwise indicated in the mass spectrum. For instance, because the charge state for ions forming the mass spectrum is known or identified in operation 303, a deconvolved mass spectrum for the detected ions may be generated. For the deconvolved mass spectrum, one axis of the mass spectrum may be mass rather than mass per charge (m/z). At operation 305, a compound, or an amount of a compound, in the sample corresponding to the detected ions may be identified. The compound or compound amount may be identified from the mass spectrum generated in operation 304 and/or from the charge state(s) identified in operation 303.

Figure 3B:
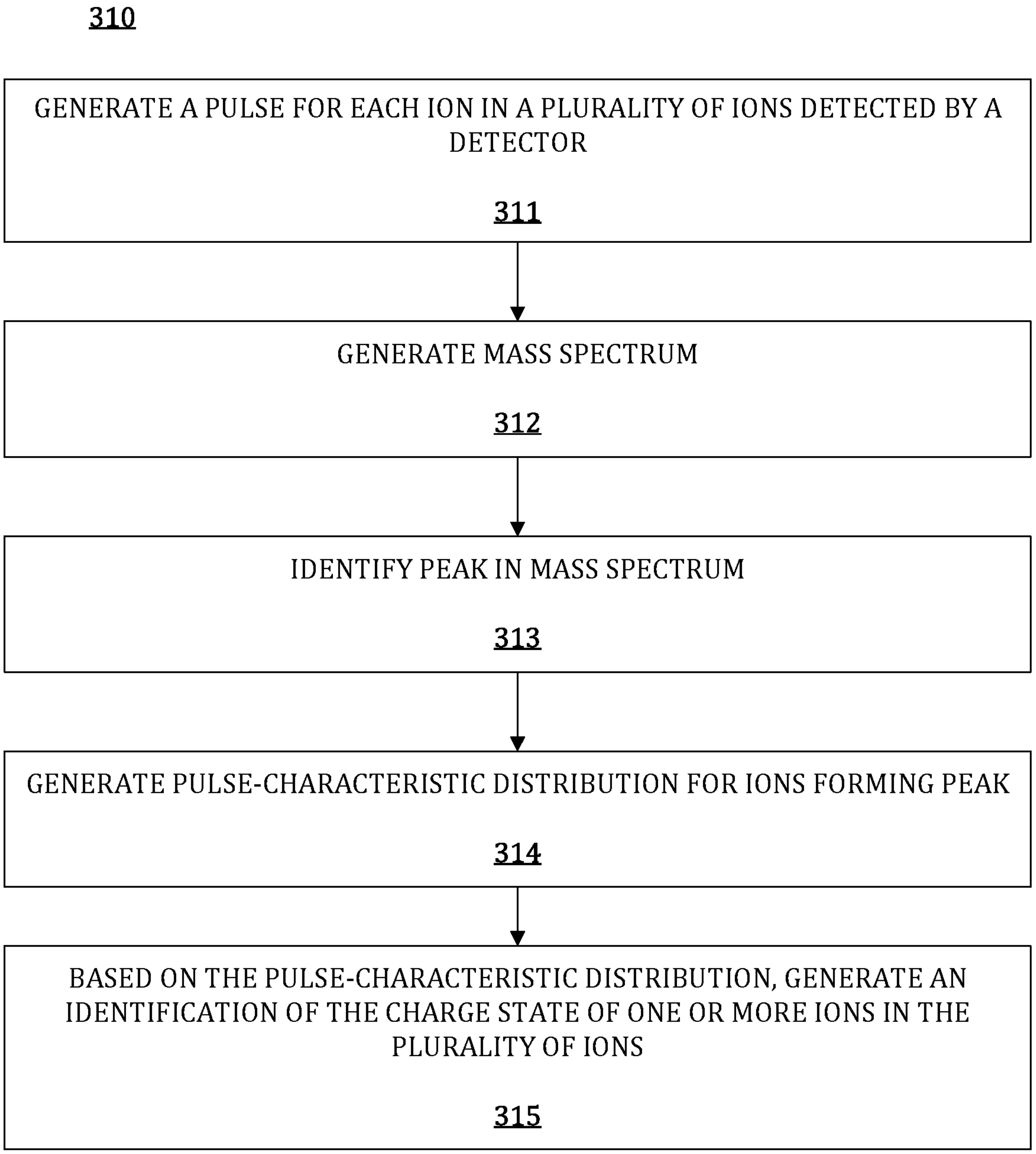
FIG. 3B depicts another example method for charge state assignment.

FIG. 3B depicts another example method 310 for charge state assignment. At operation 311, a pulse is generated for each ion in a plurality of ions detected by a detector. Operation 311 may be substantially the same or similar as operation 301 discussed above. The generated pulses may be stored in memory for subsequent analysis. At operation 312, a mass spectrum is generated based on the m/z values of the detected ions. At operation 313, a peak in the mass spectrum may be selected and/or identified. For example, the peak may be automatically identified through a peak-finding algorithm. In other examples, the peak may be identified and/or selected based on manual input received from a user. The identified peak has an associated m/z position or value. The m/z position may be the central location of the peak and/or the centroid or weighted average m/z position on the peak.

At operation 314, one or more pulse-characteristic distributions are generated for the ions forming the peak identified in operation 313. The ions forming the peak may be ions that are identified via a peak finding algorithm. The ions may also be ions that are within a particular m/z range of the m/z value of the identified peak. For instance, the m/z range may be selected based on characteristics of the peak and/or may be a preset range (e.g., a fixed m/z value). As an example, the m/z range may be from the beginning m/z value of the peak (i.e., where the peak begins) to the ending m/z value of the peak (i.e., wherein the peak ends).

For each of the ions forming the peak and/or within the m/z range, the corresponding pulses for those ions may be accessed. The pulses may be plotted or stored in manner that indicates probability or frequency versus pulse characteristic (e.g., pulse height). For instance, the plot may be similar to the plot in FIG. 2, or an array of pulse characteristic and probability/frequency pairs may be generated and/or stored. One or more pulse-characteristic distributions may then be identified or generated for the pulses. For instance, if the peak is formed of ions having different charge states, multiple pulse-characteristic distributions may be generated.

At operation 315, based on a pulse-characteristic distribution generated in operation 314, a charge state of one or more ions forming the identified peak is identified and/or assigned. Operation 315 may be similar to operation 303 in FIG. 3A and discussed above, and identifying the charge state may be identified in a similar manner as discussed above. Based on the identified and/or assigned charge state, a mass spectrum may be generated and/or a compound or compound amount may be identified as discussed above with reference to operations 304 and 305.

Figure 3C:
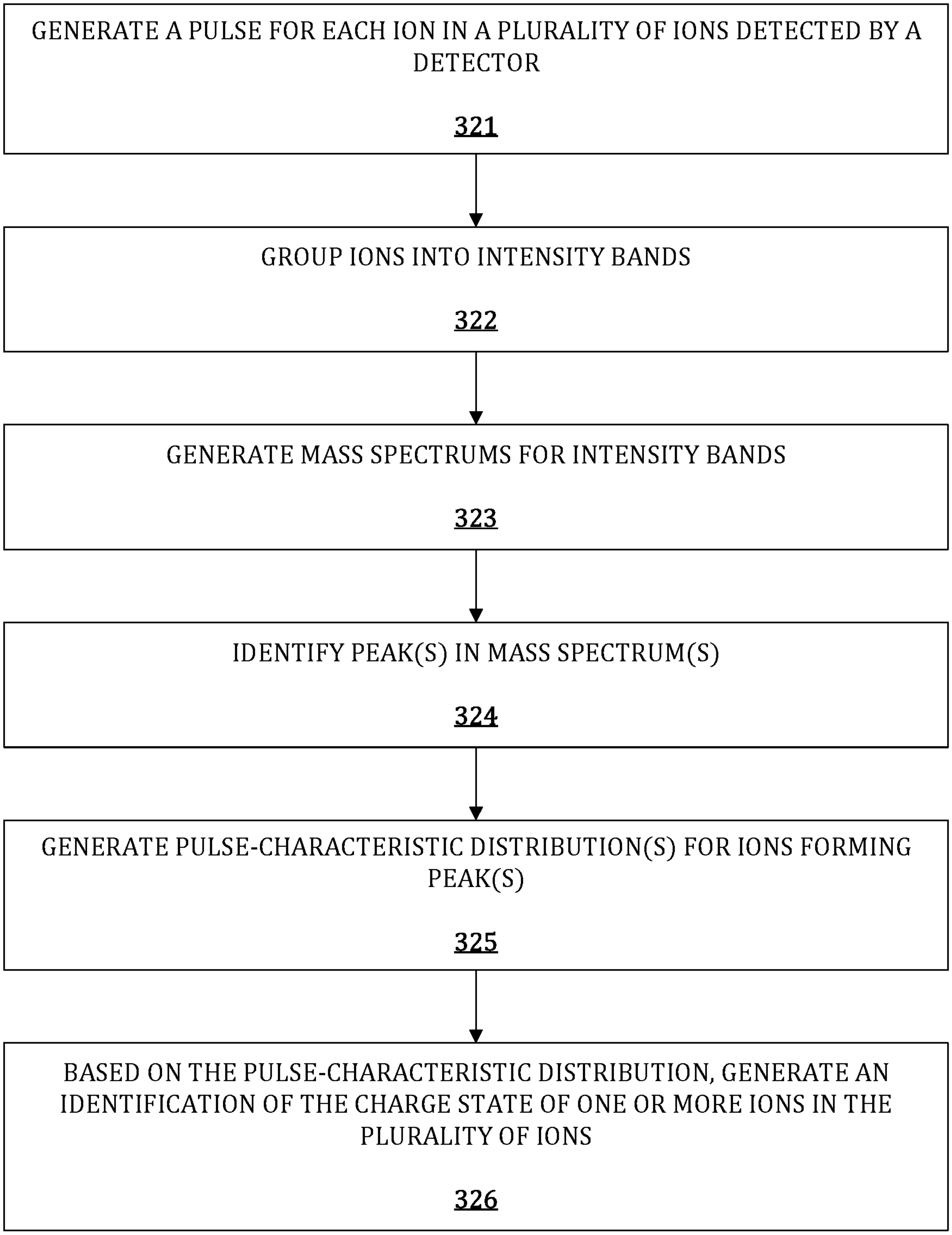
FIG. 3C depicts another example method for charge state assignment.

FIG. 3C depicts another example method 320 for charge state assignment. At operation 321, a pulse is generated for each ion in a plurality of ions detected by a detector. Operation 321 may be the same or similar as operation 301 discussed above. At operation 322, the detected ions are grouped according to their respective pulse characteristics. As an example, the pulse characteristic of pulse height may be used, the ions may be grouped into intensity bands based on their respective pulse heights. For instance, based on the pulse characteristic for each ion, a first subset of the plurality of ions may be grouped into a first intensity band and a second subset of the plurality of ions may be grouped into a second intensity band.

At operation 323, a mass spectrum for each of the intensity bands may be generated. For instance, where two intensity bands are utilized, a first mass spectrum for the first intensity band may be generated, and second mass spectrum from the second intensity band may be generated. The mass spectrums may be similar to the mass spectrums depicted in FIG. 1C and discussed above.

At operation 324, one or more peaks are identified from the mass spectrums generated in operation 323. Peak identification and/or selection may be performed in the same or similar manner as in operation 313 discussed above. By generating the mass spectrums prior to identifying the peak(s), background noise may be reduced or removed. For instance, one or more of the intensity bands may present cleaner signals and/or more well-defined peaks than a single aggregated mass spectrum for all ions. As such, peaks may be more accurately identified.

At operation 325, one or more pulse-characteristic distributions may be generated for the ions forming the peak(s) identified in operation 323 and/or within an m/z range of the m/z values of the identified peak(s). For example, a first pulse-characteristic distribution corresponding to ions having a first charge state and a second pulse-characteristic distribution corresponding to ions having a second charge state may be generated in operation 314. The pulse-characteristic distributions may be generated as discussed above, for instance with reference to operations 315 and 303.

At operation 326, based on at least one of the pulse-characteristic distribution(s) generated in operation 325, an identification of a charge state of ions forming the identified peak(s) is generated. Identifying the charge state from the pulse-characteristic distribution(s) may be performed as discussed above. For instance, operation 326 may be similar to operation 303 in FIG. 3A and discussed above, and identifying the charge state may be identified in a similar manner as discussed above. Based on the identified and/or assigned charge state, a mass spectrum may be generated and/or a compound may be identified as discussed above with reference to operations 304 and 305.

Figure 3D:
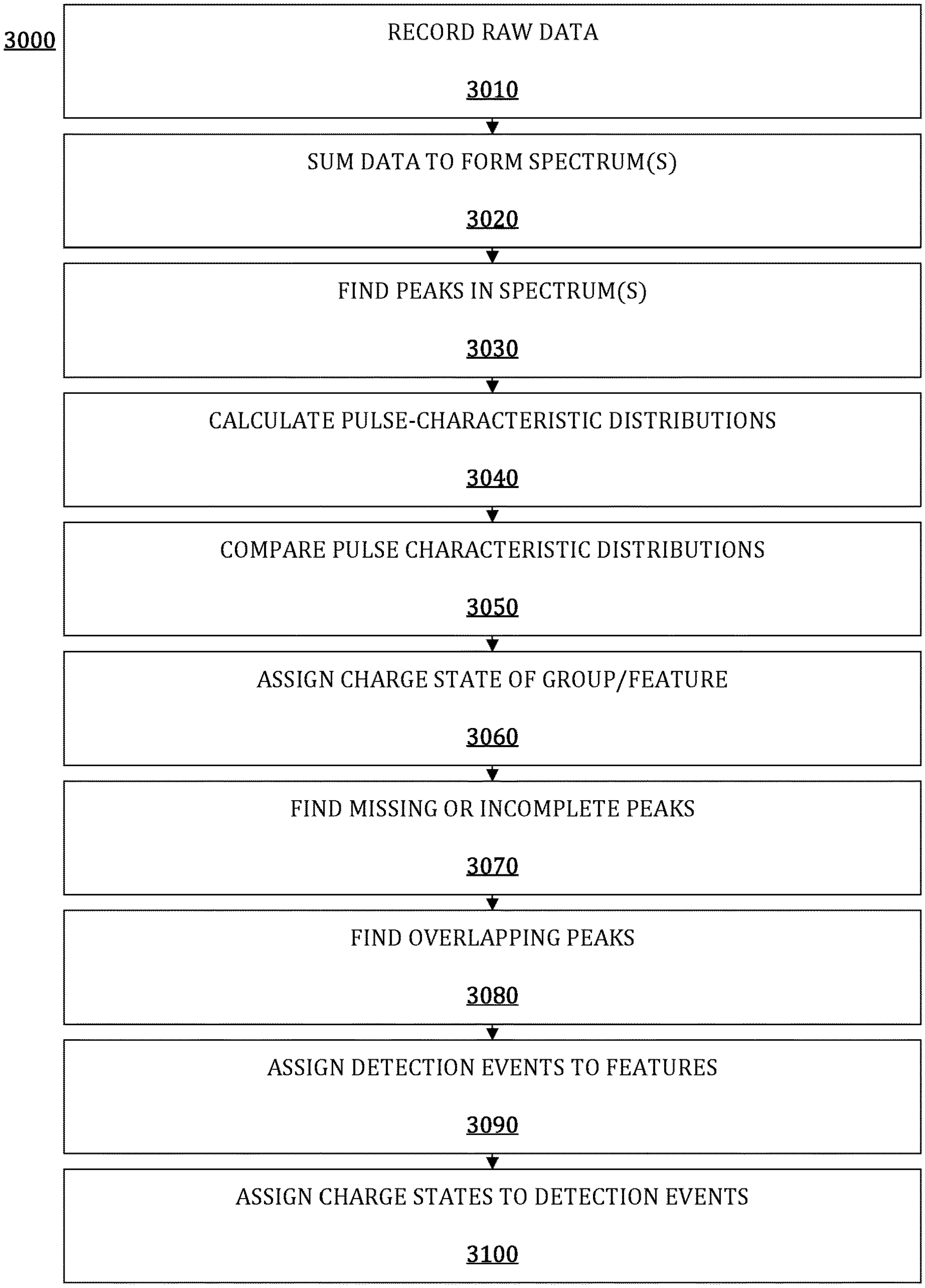
FIG. 3D depicts another example method for charge state assignment.
Figure 5:
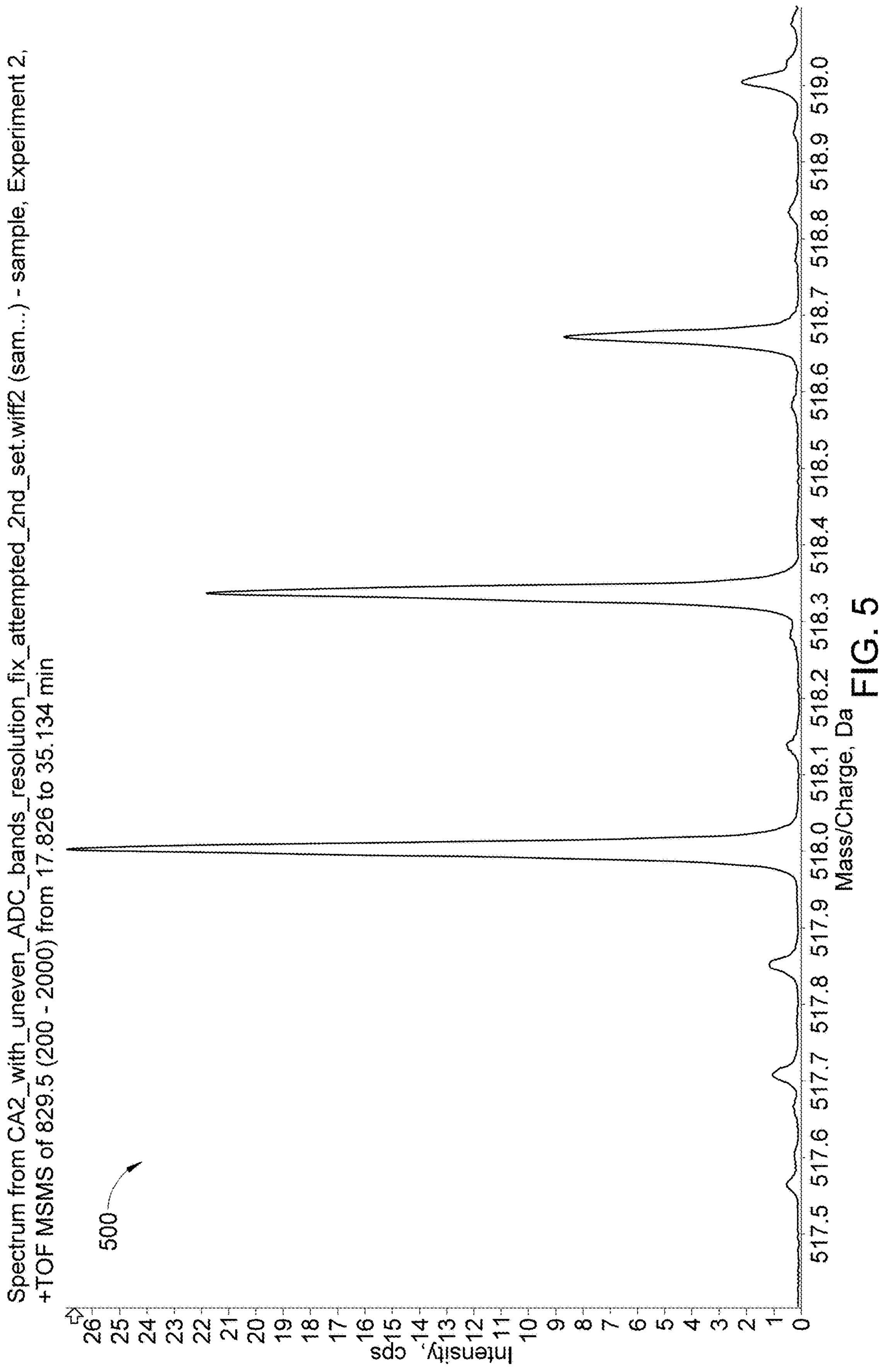
FIG. 5 depicts an example zoomed mass spectrum.

FIG. 3D depicts another example method 3000 for charge state assignment. FIG. 3D and the description of method 3000 below is a description of an example step by step set of operations that may be employed for each task and outcomes of respective steps for the example selected data set. In this example, data from a top-down ECD experiment of carbonic anhydrase 2 (CA2) is used. FIG. 5 depicts an example zoomed, or data snippet, of a mass spectrum 500 of the data for the experiment. More specifically, FIG. 5 depicts a zoomed mass spectrum 500 of m/z range 517-520 for the top-down ECD experiment of CA2.

Returning to FIG. 3D, in step 3010, the data from the detector is recorded in such a way that for each detection event a pair of intensity and corresponding m/z values is recorded and stored. For instance, for each pulse generated by the detector (due to a detected ion), at least one pulse characteristic (e.g., pulse height, pulse width, pulse area) and the corresponding m/z value for the corresponding detected ion may be stored as a pair. The data may be generated or recorded as discussed above and/or according to the methods described in in in the '720 Publication.

Figure 6:
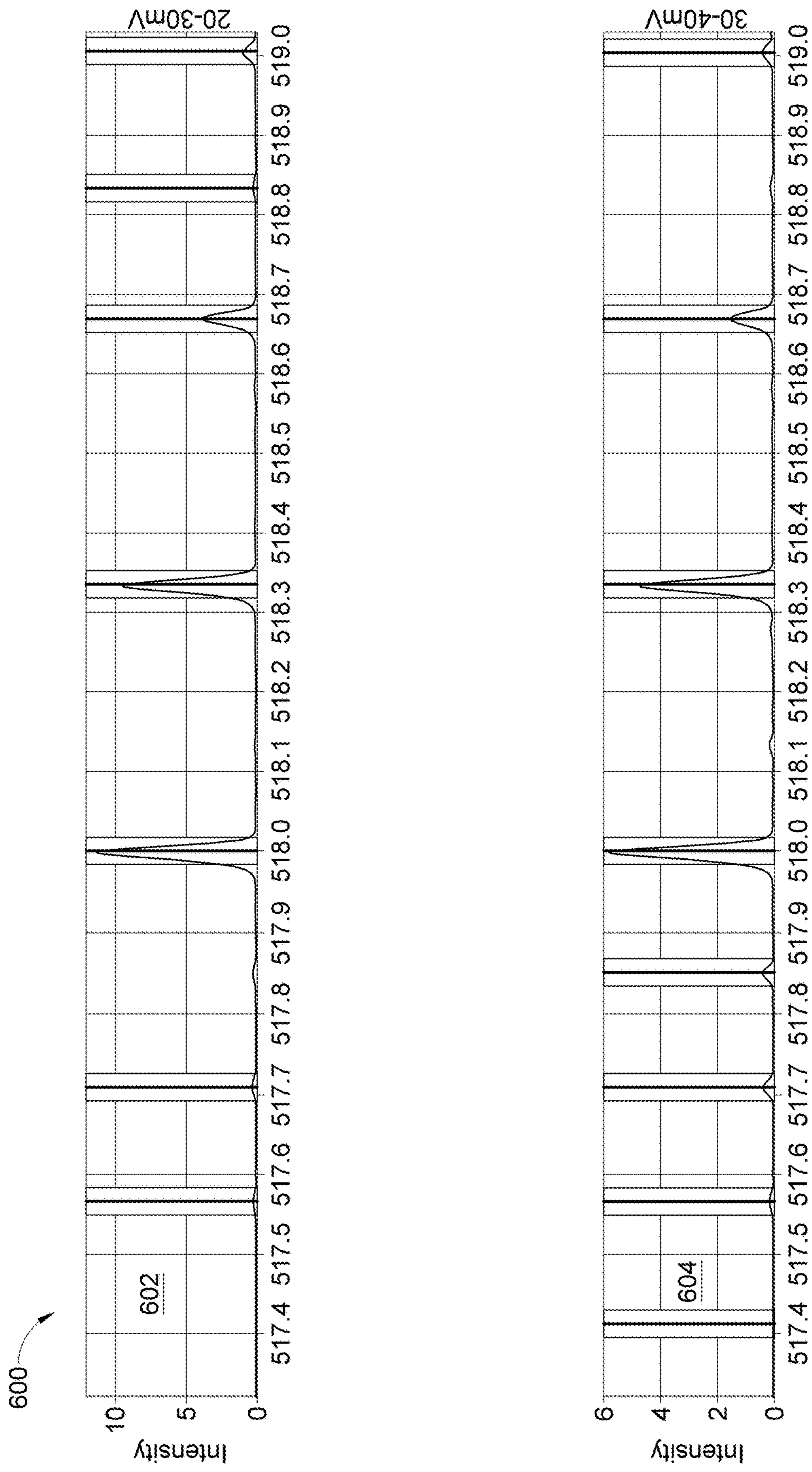
FIG. 6 depicts an example peak detection operation for banded mass spectra.

In step 3020, the recorded data is summed to a single spectrum or multiple mass spectra based on peak intensity as described above and/or in the '720 Publication. In this example, the data is summed to form multiple mass spectra corresponding to different intensity bands. FIG. 6 depicts an example of such banded mass spectra. For instance, FIG. 6 depicts a plurality 600 of banded mass spectra, including: (1) a first mass spectra 602 for ions having a corresponding pulse height between 20-30 mV; (2) a second mass spectra 604 for ions having a corresponding pulse height between 30-40 mV; (3) a third mass spectra 606 for ions having a corresponding pulse height between 40-50 mV; and (4) a fourth mass spectra 608 for ions having a corresponding pulse height between 50-60 mV.

Returning to FIG. 3D, in step 3030, a peak detection operation is performed. Various algorithms can be employed for this step, as will be appreciated by those having skill in the art. For example, a continuous wavelet transform (CWT) algorithm can be used. The highlighting/shading in FIG. 6 shows a result of peak detection procedure based on the continuous wavelet transform algorithm. For instance, each peak detected by the peak-detection algorithm has been highlighted/shaded. The line through each of the peak depicted in FIG. 6 indicates the m/z value for the respective peak. The outer boundaries of the shading/highlighting may be indicative of an m/z range for the peak discussed above.

In step 3040, pulse-characteristic distributions are calculated for each peak using the detection events filtered by their proximity to the peak apex. For instance, all pulses corresponding to ions in the highlighted area for a particular peak in FIG. 6 may be used to generate the pulse-characteristic distributions. While multiple banded mass spectra may be generated and used for peak identification (to improve the accuracy of the peak detection process), the pulses used to generate the pulse-characteristic distributions are taken from all the banded mass spectra. For example, if the selected peak for generating a pulse-characteristic distribution is the peak located at approximately 518.0 in the 30-40 mV mass spectrum 604 in FIG. 6, the pulses used to generate the pulse-characteristic distribution include pulses corresponding to ions from all the banded mass spectra 602-608 having an m/z value near the m/z value of the peak.

Figure 7:
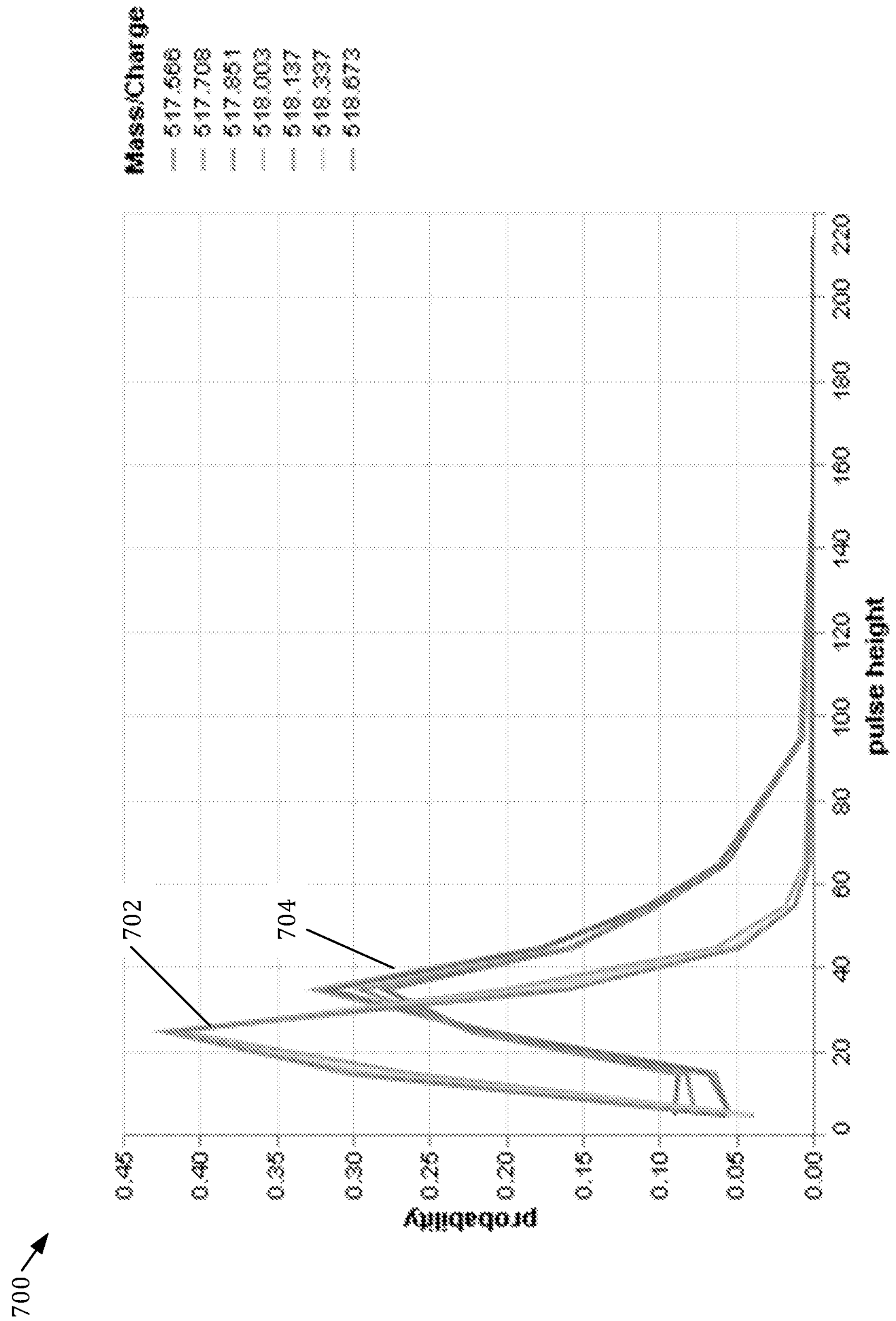
FIG. 7 depicts example pulse-height distributions for selected peaks from FIG. 6.

The generated pulse-characteristic distributions may be pulse-height distributions. An example of calculated pulse-height distributions for multiple peaks of FIG. 6 are shown in FIG. 7. As can be seen in FIG. 7, two clusters of pulse-height distributions are formed—a first cluster 702 and a second cluster 704. The first cluster 702 corresponds to ions having a first charge state, and the second cluster 704 corresponds to ions having a second charge state. While the pulse-height distributions in each cluster are not identical, two distinct groupings of profiles or distributions are clear from the plot in in FIG. 7.

Returning to FIG. 3D, in step 3050, the pulse-characteristic distributions generated in operation 3040 may be compared to one another. The comparison may be performed to group or cluster the pulse-characteristic distributions with one another. Based on the groupings or clustering, the ions and/or peaks belonging to different isotopes may be grouped together. One way to perform such comparison is to calculate relative distances between the pulse-characteristic distributions. For this, appropriate binning may be employed and pulse-characteristic distributions may be represented as vectors containing probabilities for each intensity range. A Euclidean distance or any other appropriate norm can be computed for each pair of vectors representing intensity distributions. An example of calculated pairwise Euclidean distances is shown in the table 800 depicted in FIG. 8. Peaks that have corresponding pulse-characteristic distributions with relative distance smaller than predefined threshold can be grouped together to form a feature. In the exemplary analysis, peaks are grouped into features if relative distance between each pulse-characteristic distribution within such group is smaller than 0.1, thus forming two separate groups of peaks corresponding to two distinct features. For example, two peaks identified in the mass spectra may have corresponding pulse-characteristic distributions that are very similar to one another (i.e., in the same cluster). That pulse-characteristic distribution similarity indicates that the peaks are likely formed of ions having the same charge state. Accordingly, the peaks may be grouped together as a feature and considered a part of an isotope cluster.

Returning to FIG. 3D, in step 3060, a charge state of the feature is identified with the assumption that peaks are forming an isotope cluster. To accomplish this, first, peaks corresponding to or grouped into a feature in operation 3050 may be sorted in ascending or descending order. Distances between adjacent peaks corresponding to a feature can be calculated in m/z space (e.g., the m/z distance between a first peak and a second peak). A consensus distance may then be selected either based on most abundant (thus most probable) distance for a particular feature or the smallest distance if it can appropriately explain the other observed distances (e.g., other distances being multiples of the consensus distance). The distances between the adjacent isotopes in an isotope cluster are inversely proportional to the feature charge, and thus the feature charge can be inferred from those distances.

An example of such a calculation is shown in FIG. 9. FIG. 9 depicts two features where peaks have been grouped based on the similarity of their corresponding pulse-characteristic distributions. For example, for the first feature, four peaks have been grouped together. For the second feature, three peaks have been grouped together. The peak location and the m/z distance between the peaks are shown for each of the respective peaks. Based on the distance, a predicted charge state can be generated based on the inverse of the distance. For instance, the inverse of 0.142 is 7.04 (i.e., 1/0.142=7.04) and the inverse of 0.334 is 2.99 (i.e., 1/0.334=2.99). The most frequent predicted charge or distance may then be used to identify or assign the charge state. For instance, for the first feature, the most common predicted charge state due to m/z distance is about 7. Because charge states must be integers, the consensus charge state is then determined to be 7. A similar calculation is performed for the second feature to determine that the consensus charge state is 3. Of note, the distance between peaks 2 and 3 of the first feature is different than the consensus distance, and handling of that difference is discussed further below.

Returning to FIG. 3D, method 3000 may continue with step 3070, where missing peaks may be computed. Multiple strategies may be used to perform this step. For example, to find missing internal peaks, an algorithm first finds distances between adjacent peaks that are larger than consensus distance and are substantially a multiple of the consensus distance. A multiplication factor N is then calculated as N=(measured distance)/(consensus distance). An extra N−1 peaks can be inserted between those peaks in their respective positions to form complete isotope cluster.

An example of using such algorithm may be demonstrated with reference to FIG. 9. In FIG. 9, the distance between peaks 2 and 3 in the first feature is 0.286, which is larger than the distances between the other peaks in the first feature. The consensus distance for the first feature is about 0.143. Using the calculation above, N=0.286/0.143=2. Thus, one (i.e., N−1) peak may be inserted between peaks 2 and 3. Following this step provides an extra peak explaining the isotope cluster. The peak is put at a m/z position of 517.994 m/z (which is calculated by averaging m/z of peaks labeled 2 and 3).

Another algorithm may also be alternatively or additionally employed to search for missing peaks, which is not limited to finding only internal peaks. This algorithm computes positions of possible adjacent peaks and then extracts the recorded signals corresponding to such positions. This signal is further processed to form pulse-characteristic distributions, which then can be compared to one (or alternatively average) of the pulse-characteristic distributions computed for the peaks in the group using similar methods as described in steps 3050-3060. A confirmed peak is then added to the peak list of the feature.

Step 3080 may include performing an analysis to find overlapping peaks in multiple features. This step can be accomplished by comparing peak positions in each feature and finding peaks at substantially the same positions. For example, a newly found peak with m/z of 517.994 from previous step 3070 is at substantially the same position as peak 0 from feature 2 (see FIG. 9) having mass 518.003. The overlapping peaks may be identified by finding the m/z difference or distance between the peaks and comparing it to an overlap threshold. If the m/z distance is below the threshold, the peaks may be considered overlapping.

Once an overlapping peak has been identified, an extra step of finding contributions of each feature to an overlapping peak can be performed. For this a system of linear equations can be written and solved approximately with constraints or without constraints. Such constraints can include a requirement of each contribution to be non-negative. This step can be accomplished for example using algorithms of non-negative least square approximations.

At step 3090, detection events (e.g., ions corresponding to pulses) may be assigned to the features. Step 3090 may be performed for example using following algorithm. First, using a consensus distance from step 3070 and one or more additional instrumental parameters such as instrument resolution, an m/z distribution can be modelled for each peak for the feature. Second, using a consensus pulse-characteristic distribution for said feature (which can be calculated as an average of pulse-characteristic distributions of all non-overlapping peaks) and the m/z distribution from the first part of this step, two values reflecting the probability of a feature to have such detection event can be computed. These values are intersections of the m/z position and calculated m/z distribution, and similar intersection of the detection event intensity and a consensus intensity distribution attributed to a feature. A product of those values is a score, which can be used to attribute a detection event to a feature using a threshold.

Figure 10:
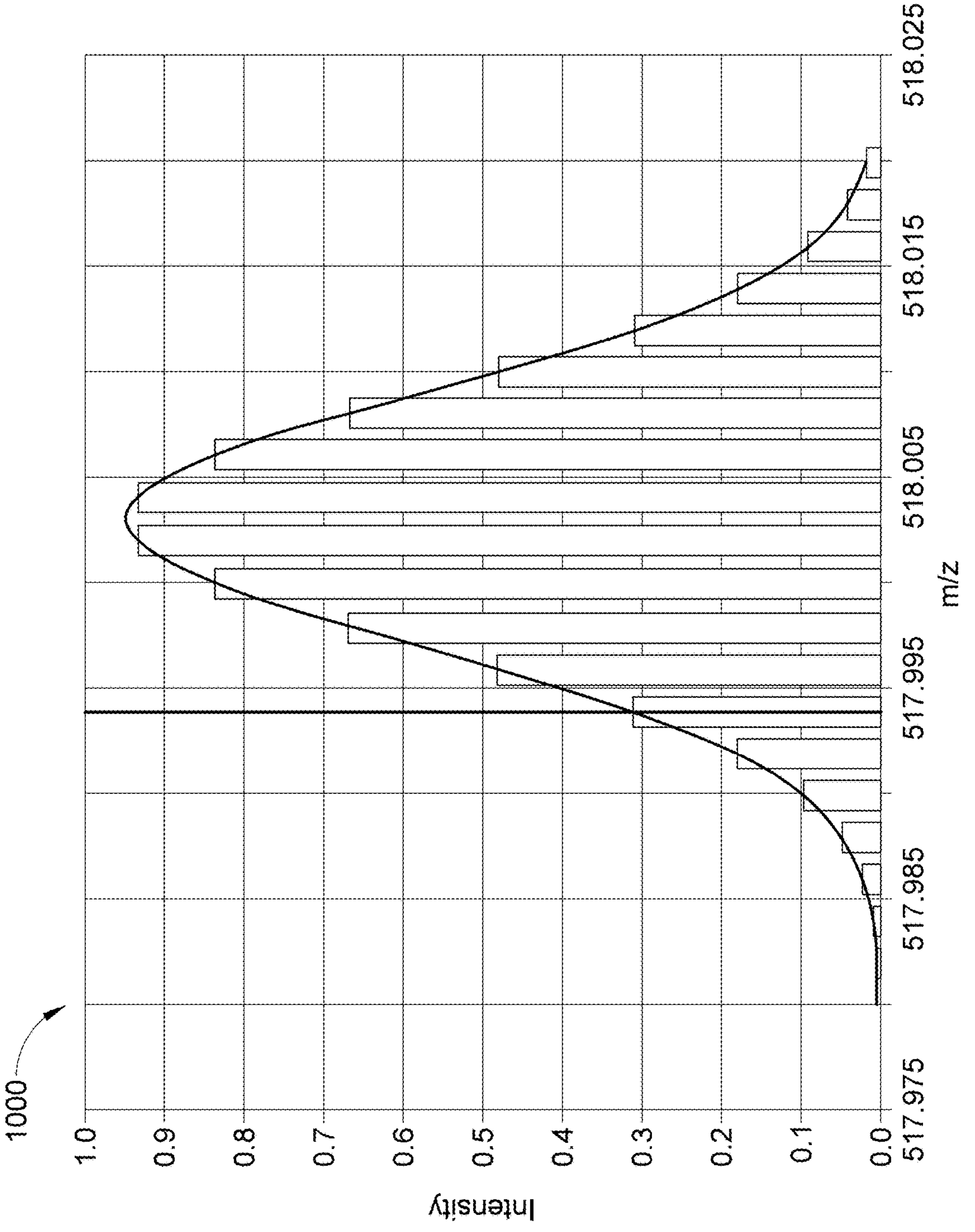
FIG. 10 depicts example plots for performing a calculation for feature attribution.

An example of calculating such a score may be provided with reference to FIG. 10, which depicts a modelled peak 1000 and a consensus pulse-characteristic distribution 1050. A detected ion to be assigned had an m/z value of 517.994 and a pulse height of 34. Those values are indicated by the vertical lines in the plots. The m/z value of 517.994 intersects with the modelled peak at an intensity of 0.31 (note the intensity has been normalized to 1 for the modeled peak). The pulse height of 34 intersects the consensus pulse-characteristic distribution at 0.25. Thus, the score may be calculated to be 0.0775 (i.e., 0.31*0.25=0.0775).

In case of multiple overlapping features, the feature that results in the highest score is selected. Additional constraints that balance the total contribution of said feature to an overlapped peak may also be set and implemented. Additional or alternative algorithms may also be implemented for this step to determine the most appropriate feature for which to assign a detection event corresponding to a detected ion. Such algorithms may estimate probabilities of the detection event belonging to a certain feature, such as by using a Bayesian framework. In step 3010, the feature charge state is assigned to the detection event.

Figure 3E:
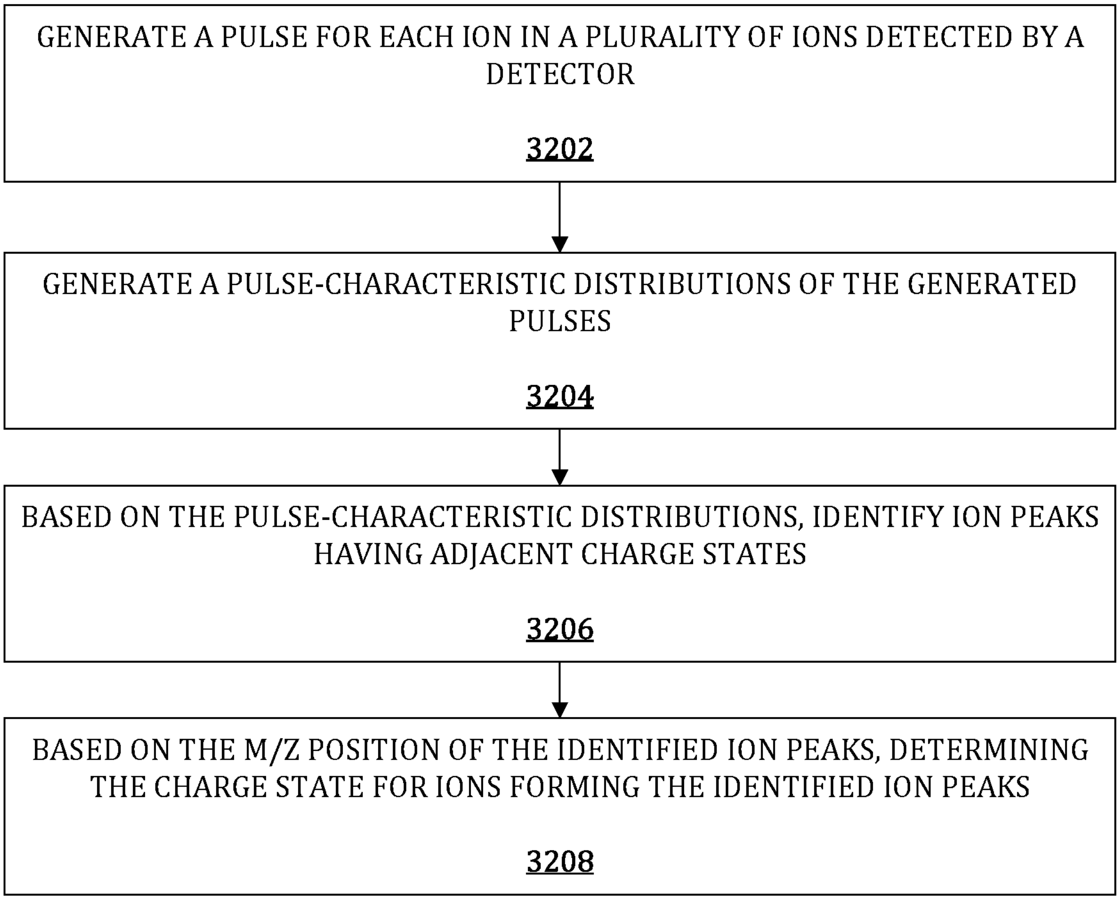
FIG. 3E depicts another example method for charge state assignment.

FIG. 3E depicts another example method 3200 for charge state assignment. At operation 3202, a pulse is generated for each ion in a plurality of ions detected by a detector. For example, when an ion impacts an electron multiplier detector, a pulse is generated. The generated pulses may be similar to the pulses depicted in FIG. 1B and discussed above. Each of the pulses may have, or be described, by their respective pulse characteristics. The detected ions maybe ions ionized from a sample being investigated or analyzed by a mass analysis technique. At operation 3204, one or more pulse-characteristic distributions are generated based on characteristics of the pulses. For example, the generated pulse-characteristic distributions may be generated for a particular pulse characteristic, such as pulse height. Accordingly, the pulse-characteristic distribution(s) generated in operation 3204 may be pulse-height distributions similar to the pulse-height distributions depicted in FIG. 2 and discussed above.

At operation 3206, based on the pulse-characteristic distributions, ion peaks having adjacent charge states are identified. Identifying peaks having adjacent charge states may include determining an estimate or coarse charge state based on the pulse-characteristic distributions. The coarse charge state identification may only be accurate to a range of possible charge states for at least one peak forming a pair and at least one charge state from this range is adjacent to the charge state identified for the second peak.

Figure 11:
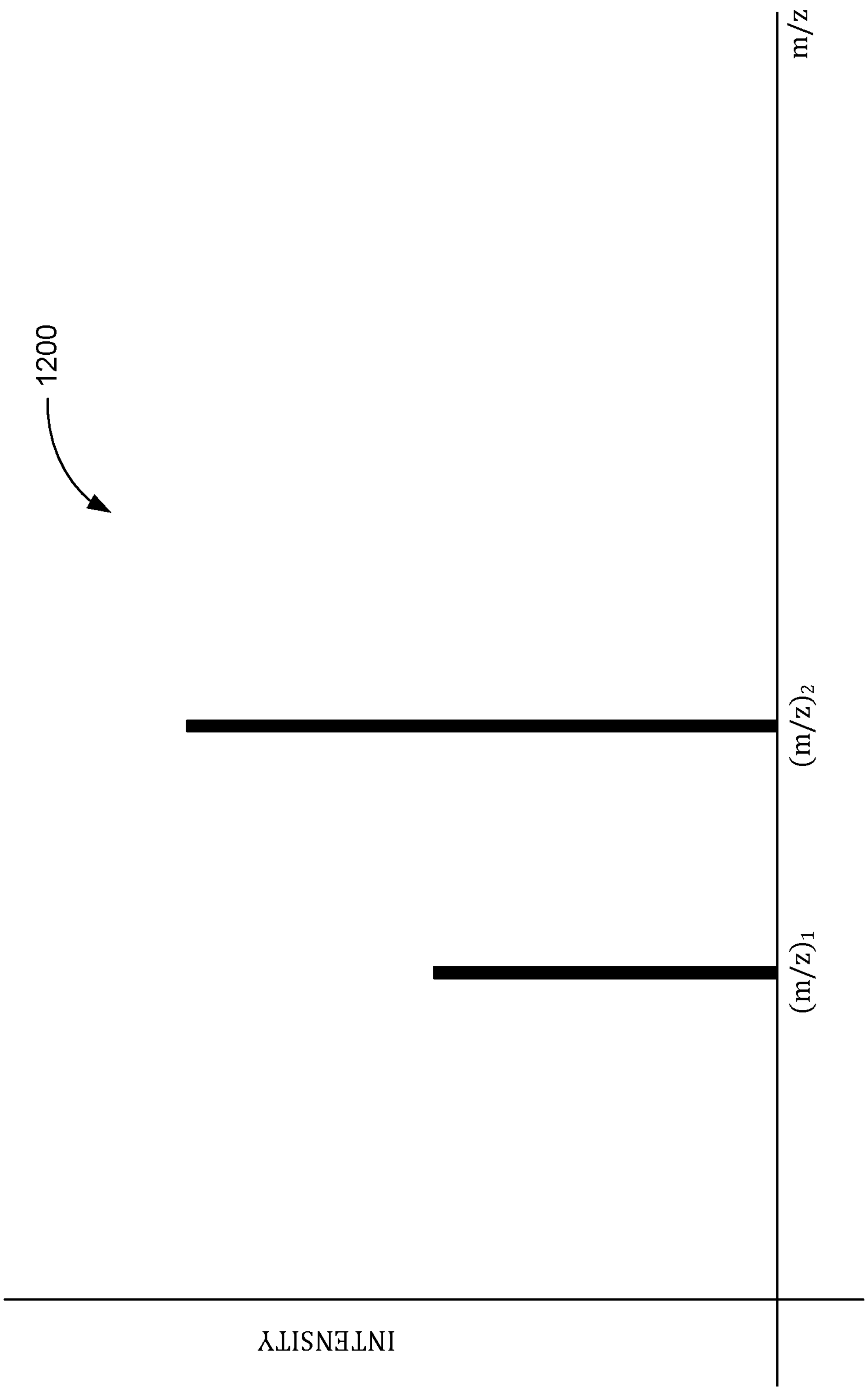
FIG. 11 depicts an example plot for adjacent charge state peaks.

An example of ion peaks having adjacent charge states are shown in the example plot 1100 in FIG. 11. A first peak is located at an m/z position of $(m/z)_1$ and a second peak has an m/z position of $(m/z)_2$. The charge states of those peaks may be estimated based on the pulse-characteristic distributions generated in operation 3204.

At operation 3208, the charge state of the charge states of the ions forming the peaks may be further determined based on the following equations:

$$(m/z)_2 = \frac{M + z_2 X}{z_2} \quad \text{Equation (1)}$$

$$(m/z)_1 = \frac{M + (z_2 + 1)X}{z_2 + 1} \quad \text{Equation (2)}$$

$$z_2 = \frac{(m/z)_1 - X}{(m/z)_2 - (m/z)_1} \quad \text{Equation (3)}$$

Equation 1 expresses a relationship of the m/z position of the second peak ($(m/z)_2$) with the non-charge carrier mass of the ion (M), the charge state of the second peak ($z_2$), and the mass of the charge carrier (X). Equation 2 expresses the relationship of the m/z position of the first peak ($(m/z)_1$) with the non-charge carrier mass of the ion (M), the charge state of the second peak ($z_2$), and the mass of the charge carrier (X). Of note, Equation 2 assumes that the charge state difference between the first peak and the second peak is 1. Thus, in other examples where the estimated charge state difference between the first peak and the second peak is value other than 1, the 1 in Equation 2 is replaced with that value.

Equation 3, which is based on Equations 1 and 2, expresses a relationship between the charge state for ions in the second peak ($z_2$) with the m/z position of the second peak ($(m/z)_2$), the m/z position of the first peak ($(m/z)_1$), and the mass of the charge carrier (M). Each of these values is either measured by the detector or is known from the ionized sample and/or sample preparation process. For instance, a common charge carrier is proton, which has a mass of ~1 atomic mass units (AMU). Accordingly, the charge state of the ions forming the second peak ($z_2$) may be determined using Equation 3. Based on the determined charge state for the ions forming the second peak ($z_2$), the charge state for ions forming the first peak ($z_1$) may be determined. The determined charge state may be a refined charge state as compared to the coarse charge state initially estimated or determined.

The refined charge state should be an integer or near an integer, such as within a threshold of an integer. If it is not, the coarse charge state identification or the refined charge state identification may be incorrect. Accordingly, the coarse and/or refined charge state identification may only be accepted if the refined identified charge state is an integer within a certain threshold. If not, the coarse charge state may be re-estimated, and the method is performed again with the revised coarse charge state. In addition, to potentially increase confidence in the assignment, a third peak with an adjacent charge state may be identified. The third peak forms a pair with at least one of the first two peaks, and the charge state identifications for said common peak are matching in both pairs.

Figure 3F:
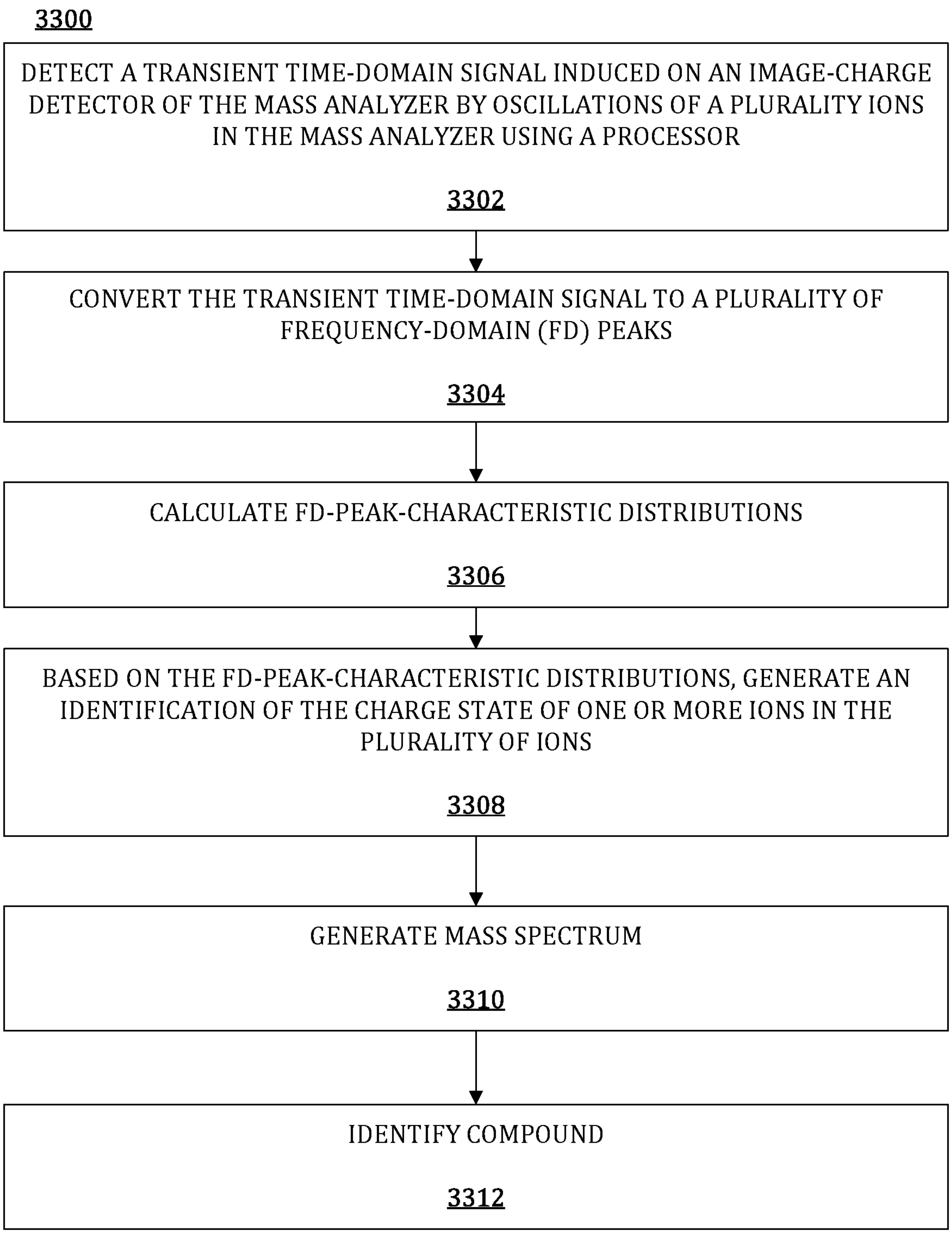
FIG. 3F depicts another example method for charge state assignment.
Figure 12:
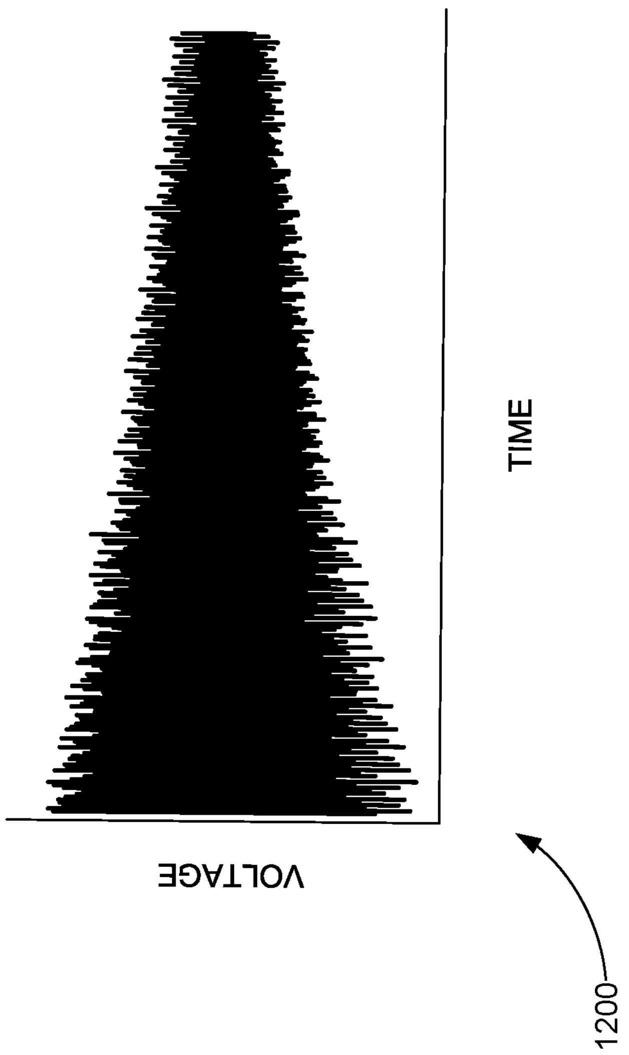
FIG. 12 depicts an example plot of a transient time-domain signal measured by an image-charge detector

FIG. 3F depicts another example method 3300 for charge state assignment. The method 3300 utilizes an image-charge detector. Unlike an ADC detector, an image-charge detector detects oscillations of the ions in the mass analyzer. FIG. 12 depicts an example plot of a transient time-domain signal measured by an image-charge detector that includes components from each of a plurality of ions oscillating in a mass analyzer. In order to decompose the transient time-domain signal measured by an image-charge detector into individual components, the transient time-domain signal is converted to a frequency-domain signal. Conversion methods include, but are not limited to, Fourier transformation or wavelet transformation. Peaks in the frequency-domain signal correspond to individual ions of the plurality of ions oscillating in a mass analyzer. Frequency-domain peaks are converted to m/z peaks using well-known formulas that are dependent on the specific type of mass analyzer in order to produce a mass spectrum.

For image-charge detectors, therefore, the intensity of frequency-domain signals or peaks are proportional to the charge state of the underlying ions similar as to how the pulses described above are proportional to charge state. Thus, the intensity or other characteristics of the frequency-domain (FD) peaks may be used to generate distributions similar to the pulse-characteristic distributions discussed above. Distributions generated from the characteristics of the FD peaks may be referred to as FD-peak-characteristic distributions or FD-peak-intensity distributions where intensity of the FD peak is used as the characteristic of interest. The FD-peak-characteristic distributions may then be used in substantially the same manner as the pulse-characteristic distributions to determine charge state.

Returning to FIG. 3F, at operation 3302, a transient time-domain signal induced on an image-charge detector of the mass analyzer by oscillations of a plurality of ions in the mass analyzer is detected. At operation 3304, the transient time-domain signal is converted to a plurality of frequency-domain (FD) peaks. Each frequency-domain peak may correspond to an ion of the plurality of ions.

At operation 3306, one or more FD-peak-characteristic distributions are generated. For example, the generated FD-peak-characteristic distributions may be generated for a particular FD-peak-characteristic, such as intensity. At operation 3308, based on the one or more FD-peak-characteristic distributions generated in operation 3306, an identification of a charge state of one or more ions in the plurality of ions detected in operation 3302 is generated. Identifying the charge state based on the FD-peak-characteristic distributions may be performed using any of the method described herein using the pulse-characteristic distributions. For instance, the FD-peak characteristic distributions may be used in place of the pulse-characteristic distributions.

At operation 3310, a mass spectrum is generated for the detected ions. The mass spectrum may be generated based on the identified charge state(s) in operation 3308. For example, with the known charge state, overlapping peaks may be resolved or otherwise indicated in the mass spectrum. For instance, because the charge state for ions forming the mass spectrum is known or identified in operation 3308, a deconvolved mass spectrum for the detected ions may be generated. For the deconvolved mass spectrum, one axis of the mass spectrum may be mass rather than mass per charge (m/z). At operation 3312, a compound, or an amount of a compound, in the sample corresponding to the detected ions may be identified. The compound or compound amount may be identified from the mass spectrum generated in operation 304 and/or from the charge state(s) identified in operation 3312.

Figure 13:
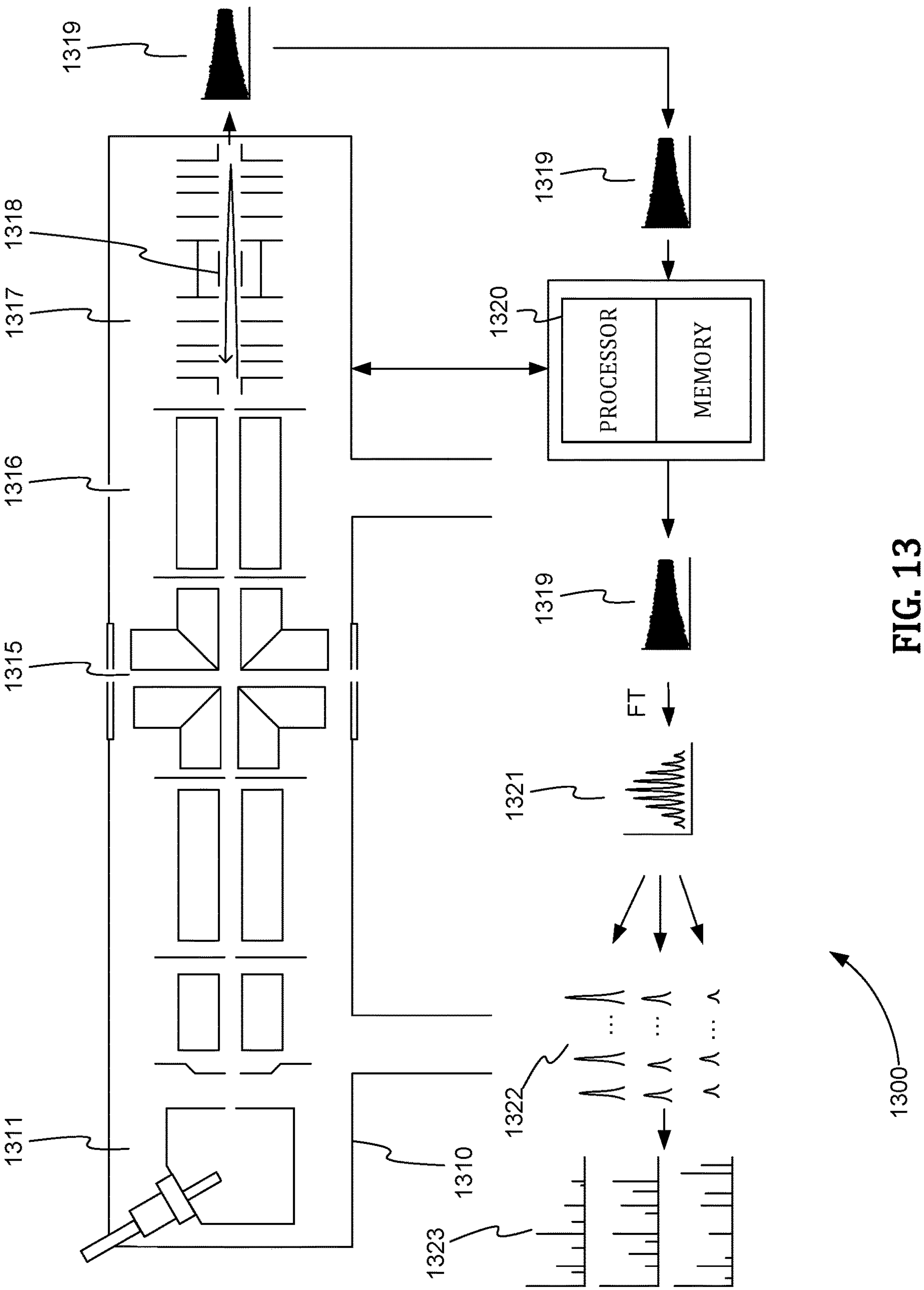
FIG. 13 depicts an example system including an image-charge detector.

FIG. 13 depicts an example system 1300 including an image-charge detector 1318. the system of FIG. 13 includes mass spectrometer 1310 and computing components including memory and a processor 1320. The computing elements of the system, such as the processor 1320 and memory, may be included in the mass spectrometer itself, located adjacent to the mass spectrometer, or be located remotely from the mass spectrometer. In general, the computing elements of the system may be in electronic communication with the detector 1318 such that the computing elements are able to receive the signals generated from the detector 1318. The processor 1320 may include multiple processors and may include any type of suitable processing components for processing the signals and generating the results discussed herein.

Mass spectrometer 1310 includes mass analyzer 1317. Mass analyzer 1317 includes image-charge detector 1318. Image-charge detector 1318 produces oscillating signals or transient time-domain signals for detected ions with amplitudes that are proportional to the ion charge state. Mass analyzer 1317 can be any type of mass analyzer that can detect ions using an image-charge detector including, but not limited to, an electrostatic linear ion trap (ELIT), an FT-ICR, or an orbitrap mass analyzer. Mass analyzer 1317 is shown in FIG. 13 as an ELIT, and image-charge detector 1318 is shown as a pickup electrode of the ELIT.

The mass analyzer 1317 detects transient time-domain signal 1319 induced on image-charge detector 1318 by oscillations of a plurality of ions in mass analyzer 1317. The plurality of ions is transmitted to mass analyzer 1317 by mass spectrometer 1310. Processor 1320 converts transient time-domain signal 1319 to a plurality of frequency-domain pulses or peaks 1321. Each frequency-domain signal corresponds to an ion of the plurality of ions. Processor 1320 converts transient time-domain signal 1319 to a plurality of frequency-domain peaks 1321 using a Fourier transform, for example.

Processor 1320 may compare an intensity of each frequency-domain peak of plurality of frequency-domain peaks 1321 to two or more different predetermined intensity ranges corresponding to two or more different charge state ranges. Processor 1320 may store each frequency-domain peak in one of two or more data sets 1322 corresponding to the two or more predetermined intensity ranges based on the comparison. Processor 1320 may create a mass spectrum based on frequency-domain peaks and/or the identified charge states discussed herein.

In various embodiments, processor 1320 converts transient time-domain signal 1319 to plurality of frequency-domain peaks 1321, compares an intensity of each frequency-domain peak to two or more different predetermined intensity ranges, and stores each frequency-domain peak in one of two or more data sets 1322 during acquisition. In an alternative embodiment, processor 1320 converts transient time-domain signal 1319 to plurality of frequency-domain peaks 1321, compares an intensity of each frequency-domain peak to two or more different predetermined intensity ranges, and stores each frequency-domain peak in one of two or more data sets 1322 after acquisition.

As described above, if multiple copies of the same ion are oscillating in mass analyzer 1317 at the same time, the measured intensity may not be proportional to the charge state. As a result, in various embodiments, mass spectrometer 1310 transmits ions to mass analyzer 1317 so that mass analyzer 1317 only includes a single ion of a specific m/z and charge state at any given time.

In various embodiments, the system of FIG. 13 further includes ion source device 1311. Ion source device 1311 can be an electrospray ion source (ESI) device, for example. Ion source device 1311 is shown as part of mass spectrometer 1310 in FIG. 13 but can be a separate device also.

In addition, mass spectrometer 1310 further includes a dissociation device. The dissociation device can be, but is not limited to, ExD device 1315 or CID device 1313. A dissociation device can be used for top-down protein analysis, for example.

In top-down protein analysis, ion source device 1311 ionizes a protein of a sample, producing a plurality of precursor ions for the protein in an ion beam. The dissociation device dissociates the plurality of precursor ions in the ion beam, producing a plurality of product ions with different charge states in the ion beam. The mass spectrometer 1310 transmits the plurality of product ions to mass analyzer 1317 so that the plurality of product ions are the plurality of ions transmitted to mass analyzer 1317 by mass spectrometer 1310, as described above.

In various embodiments, processor 1320 is used to control or provide instructions to ion source device 1311 and mass spectrometer 1310 and to analyze data collected. Processor 1320 controls or provides instructions by, for example, controlling one or more voltage, current, or pressure sources (not shown).

Figure 4:
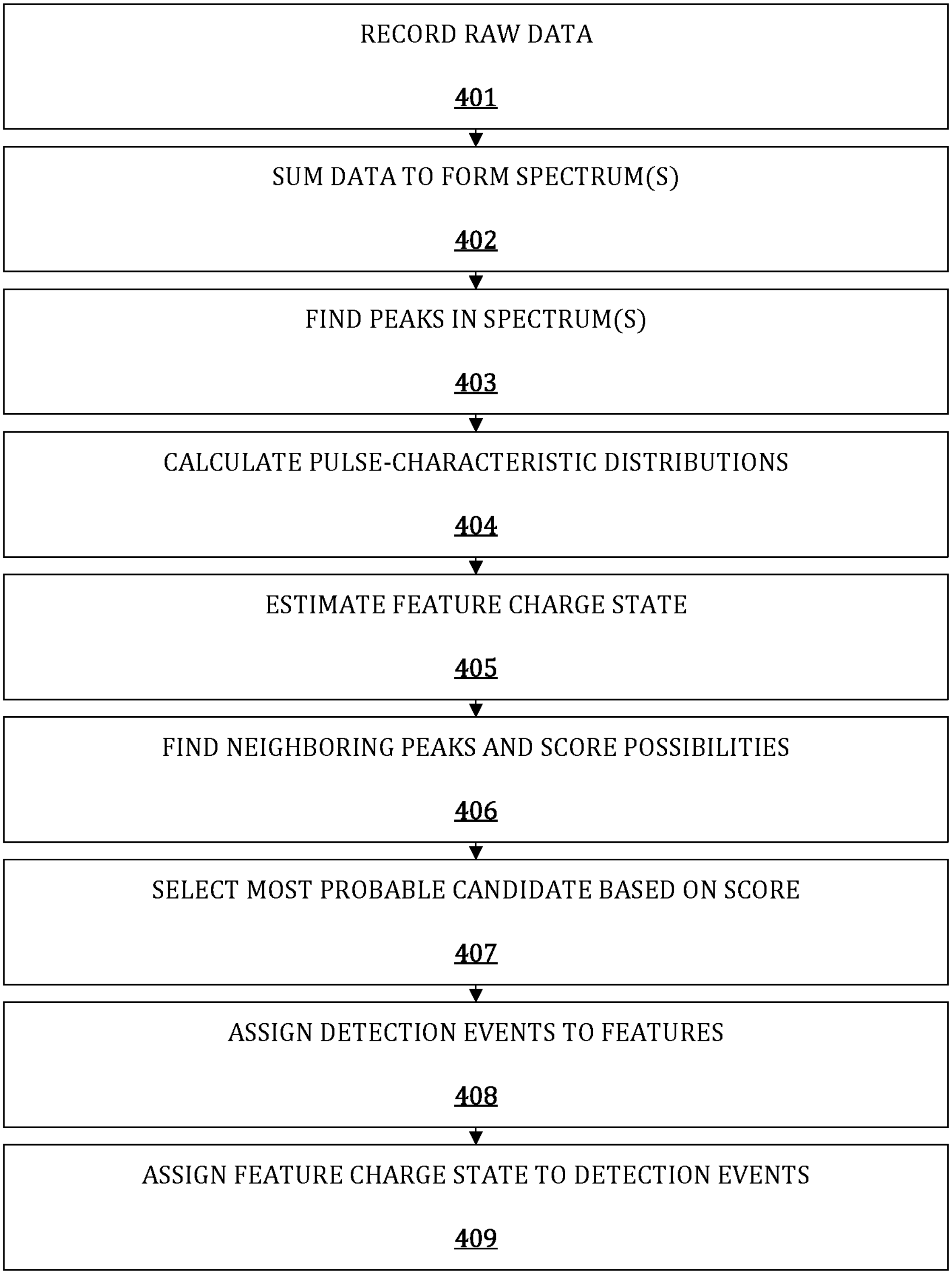
FIG. 4 depicts another example method for charge state assignment.

FIG. 4 depicts another example method 400 for charge state assignment. Method 400 may be particularly useful if isotope distribution is not sufficiently resolved for at least a number of the peaks. Operations 401-404 may be substantially the same as operations 3010-3040. At operation 405, a charge state for a feature may be estimated. The feature may be formed of a plurality of peaks sharing a similar pulse-characteristic distribution, and the grouping of peaks to form features may be performed as discussed above with respect to operations 3050-3060. At operation, 406, for each possible charge state estimated in operation 405, neighboring peaks may be identified and possibilities may be scored for the neighboring peaks. At operation 407, a most probable candidate is selected based on the scoring performed at operation 407. Detection events may then be assigned to features in operation 408, and a feature charge state maybe assigned to the detection events based on the charge state of the feature.

In another example, the methods in FIGS. 3A-3E may be combined with the method in FIG. 4. In such an example, peaks having isotope pattern sufficiently resolved may be processed using the strategy described in method 3000 of FIG. 3D. For remaining peaks, which have isotopic patterns substantially unresolved, a strategy from FIG. 4 may be used. In such a combination, an extra step defining whether the found peak is isotopically resolved or not can be employed. This step for example can compare peak width of the detected feature to the characteristic peak width for this mass spectrometer for resolved feature and non-resolved feature.

For all these methods, three positive outcomes can generally be envisaged and may be practically identical in their utility. First, using the information (e.g., charge state) about an individual detection events, a deconvolved mass spectrum may be generated using formulae $(m/z-m_p)*Z$, Z is the determined charge state and where $m_p$ is a mass of proton. Second, this information may be used to compose a set of spectra for each charge state covering either whole m/z range or sections of m/z ranges. Third, this information may be used to generate a list of individual features each having m/z and z assigned to it. A compound and/or an amount of a compound present in an analyzed sample may then be determined or generated based on the identified features.

For all described embodiments, the step of assigning a charge state to an individual detection event can be substituted with or include assigning probabilities of said detection event originating from the ions forming a feature and hence assigning a probability of said detection event being associated with a charge state assigned to this feature. Such probabilities may, for instance, be calculated using a Bayesian framework. At a subsequent step of collating a representative mass spectrum (either entire or partial), a proportional contribution from the detection event can then be accordingly distributed among the features it represents with their respective positions within the mass spectrum.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for classifying a charge state of detected ions, the method comprising:

generating a pulse for each ion in a plurality of ions detected by a detector, wherein each pulse has a pulse characteristic;

generating a pulse-characteristic distribution of the generated pulses; and based on the pulse-characteristic distribution, generating an identification of the charge state of one or more ions in the plurality of ions.

2. The method of claim 1, wherein the pulse-characteristic distribution is a plot of probability versus pulse characteristic.

3. The method of claim 1, wherein the pulse characteristic is at least one of a pulse height, a pulse width, or a pulse area.

4. The method of claim 3, wherein the pulse characteristic is pulse height, and the pulse height is a maximum voltage of the pulse.

5. The method of claim 1, wherein the detector is an electron multiplier detector and the detector is configured to detect predominantly single ion events.

6. The method of claim 1, generating an identification of the charge state comprises comparing the pulse-characteristic distribution with a reference pulse-characteristic distribution.

7. The method of claim 1, further comprising based on the identification of the charge state, generating a deconvolved mass spectrum for the detected ions, wherein one axis of the mass spectrum is mass rather than mass per charge (m/z).

8. The method of claim 1, wherein the plurality of ions are grouped using m/z domain into different groups, and the identification of charge state based on the pulse-characteristic distribution is performed for each group.

9. The method of claim 8, wherein the grouping step comprises:

generating mass spectrums based on the plurality of detected ions;

identifying a first peak in the mass spectrum, wherein the first peak has a mass per charge (m/z) value; and grouping ions within a mass per charge (m/z) range, based on the m/z value of the first peak.

10. The method of claim 9, further comprising:

identifying a second peak;

based on at least the first peak and the second peak, determining a consensus m/z distance;

identifying that the first peak and the second peak form a feature; and wherein generating the identification of the charge state is based on the consensus distance.

11. The method of claim 10, wherein the step of identifying that the peaks form the feature comprises comparing pulse-characteristic distributions of said peaks and selecting peaks with substantially the same pulse-characteristic distributions.

12. The method of claim 11, wherein the comparison of pulse-characteristic distributions is performed by calculating Euclidean distance between said pulse-characteristic distributions and comparing it with a predetermined threshold.

13. The method of claim 9, further comprising, based on the identification of the charge state, determining one or more isotopes corresponding to the one or more ions forming the first peak.

14. The method of claim 8, wherein grouping step comprises:

selecting a first subset of the plurality of ions into a first intensity band and selecting a second subset of the plurality of ions into a second intensity band; and generating a first mass spectrum for the first intensity band;

generating a second mass spectrum for the second intensity band;

identifying a first peak in at least one of the mass spectra, wherein the first peak has a mass per charge (m/z) value; and grouping ions within a mass per charge (m/z) range, based on the m/z value of the first peak.

15. The method of claim 8, further comprising generating a second pulse-characteristic distribution for the ions within the m/z range, and wherein generating the identification includes:

determining that ions forming a first pulse-characteristic distribution distribution have a first charge state; and determining that ions forming the second pulse-characteristic distribution have a second charge state.

16. The method of claim 15, wherein generating an identification of the charge state comprises comparing the first pulse-characteristic distribution with a reference pulse-characteristic distribution.

17. The method of claim 16, wherein the ions detected by the detector are generated from ionization of a sample, and the reference pulse-characteristic distribution is identified based on known characteristics of the sample.

18. A mass analysis system comprising:

a detector to configured to generate a pulse for each ion detected by the detector;

a processor; and a memory storing instructions that are configured to, when executed by the processor, cause the system to perform a set of operations comprising:

generating a pulse for each ion in a plurality of ions impacting an electron multiplier detector, wherein each pulse has a pulse characteristic;

generating a pulse-characteristic distribution of the generated pulses; and based on the pulse-characteristic distribution, generating an identification of a charge state of one or more ions in the plurality of ions.

19. The mass analysis system of claim 18, wherein the detector is an electron multiplier detector.

20. The mass analysis system of claim 18, wherein the mass analysis system further includes an ion source device, a dissociation device, and a mass analyzer.

* * * * *